United States Patent
Schenk

(10) Patent No.: US 7,899,127 B2
(45) Date of Patent: Mar. 1, 2011

(54) METHOD AND DEVICE FOR REDUCING THE CREST FACTOR OF A SIGNAL

(75) Inventor: Heinrich Schenk, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1337 days.

(21) Appl. No.: 11/270,312

(22) Filed: Nov. 9, 2005

(65) Prior Publication Data

US 2006/0115028 A1      Jun. 1, 2006

(30) Foreign Application Priority Data

Nov. 9, 2004   (DE) ..................  10 2004 054 070

(51) Int. Cl.
 *H04L 5/12*        (2006.01)
(52) U.S. Cl. ................. 375/261; 375/296; 375/285; 375/335; 375/346
(58) Field of Classification Search .................. 375/261

See application file for complete search history.

(56) References Cited

U.S. PATENT DOCUMENTS

| | | | | |
|---|---|---|---|---|
| 3,614,623 A * | 10/1971 | McAuliffe | ................... | 375/232 |
| 4,771,267 A * | 9/1988 | Russell et al. | ............... | 341/118 |
| 6,275,836 B1 * | 8/2001 | Lu | ............... | 708/313 |
| 6,424,681 B1 | 7/2002 | Tellado et al. | | |
| 6,529,925 B1 * | 3/2003 | Schenk | ......... | 708/300 |
| 7,286,605 B2 * | 10/2007 | Laaser | ......... | 375/260 |

\* cited by examiner

*Primary Examiner*—Shuwang Liu
*Assistant Examiner*—Lihong Yu
(74) *Attorney, Agent, or Firm*—SpryIP, LLC

(57) ABSTRACT

A method and a device for reducing the crest factor of a signal is operable to generate a correction signal as a combination of a plurality of partial correction signals having respectively predetermined frequencies and a signal having a reduced crest factor being issued as a differential between the correction signal and the signal. The respectively predetermined frequencies are selected such that the correction signal, which has a period length that is shorter than a length of the signal, is periodic. Therefore, according to the invention, only one period of the correction signal is determined and the correction signal is then determined as a periodic continuation of the one period.

56 Claims, 10 Drawing Sheets

METHOD AND DEVICE FOR REDUCING THE CREST FACTOR OF A SIGNAL

FIELD OF THE INVENTION

The present invention relates to a method and a device for reducing the crest factor of a signal, the crest factor being the ratio of the peak value to the average value of the signal. It relates, in particular, to a method and a device for reducing the crest factor of a communication signal which is transmitted on the basis of a multi-carrier method such as discrete multitone modulation (DMT). Multi-carrier methods of this type are used, in particular, in xDSL communication systems (digital subscriber line) such as ADSL (Asymmetric Digital Subscriber Line) or VDSL (Very High Bit Rate Digital Subscriber Line) systems and also, under the designation ODFM (Orthogonal Frequency Division Multiplex), in digital radio (DAB, Digital Audio Broadcast).

BACKGROUND

FIG. 13 schematically illustrates a multi-carrier transmission system of this type. A serial digital data stream a is supplied to a serial/parallel converter 1, which divides the serial digital data stream a into data packets comprising N/2 sub-packets, N being an integer. Each data packet is transmitted in parallel to an encoder 2, which modulates each of the sub-packets to an individual carrier having a predetermined carrier frequency ("tone"), using, for example, the quadrature amplitude modulation (QAM) method. A first digital signal vector, which is supplied to a device 3 for carrying out an inverse Fourier transformation, is thereby generated. A second digital signal vector, which comprises N sampled values of a transmission signal, is generated by means of the inverse Fourier transformation of the first digital signal vector. A prefix and a suffix are optionally (for example, in the case of VDSL) also added to this second digital signal vector, and the second digital signal vector is then supplied to a parallel/serial converter 4, which issues the corresponding sampled values in series. The second digital signal vector is also referred to as an IFFT frame or a DMT frame.

The sampled values are filtered using a digital filter 35, converted into an analog signal using a digital/analog converter 36 and amplified in a line driver 37. The resulting analog transmission signal is transmitted via a transmission channel 38. During transmission through the transmission channel 38, a noise b is added to the signal, symbolised by an adder 39. On the receiver side, the signal thus received is supplied to an assembly 40, which comprises an equalizer, a filter and an analog/digital converter. The signal is then decoded in that substantially the opposite steps to those on the transmission side are carried out by means of the blocks 1 to 4, for which purpose a serial/parallel converter 30, a device 31 for carrying out a Fourier transformation, a decoder 32, a slicer or decision element 33 and a parallel/serial converter 34 are provided. Finally, the parallel/serial converter 34 issues a received data stream a', which, provided that no transmission errors occur, corresponds to the transmission data stream a.

A communication system of this type is known, for example, from U.S. Pat. No. 6,529,925 B1.

As the transmission signal transmitted via the transmission channel 38 is composed of a large number of different signals, in particular sinusoidal signals, having various carrier frequencies, the respective amplitudes and phases of which are determined by the serial data stream a and therefore do not exhibit any predetermined relationships to one another, the amplitude of the transmission signal exhibits approximately a Gaussian distribution. Curve 41 from FIG. 14 displays the probability p of the occurrence of an amplitude A of the transmission signal, which probability was calculated by means of a simulation of a transmission signal having a frame length of 256 and modulated using the discrete multitone modulation (DMT) method.

Within this Gaussian distribution, the crest factor of the transmission signal is relatively high, i.e. very high maximum amplitudes, compared with the average amplitude value, may occur. As the blocks 35, 36, 37 and 39 from FIG. 13, in particular the digital/analog converters or analog/digital converters and the line drivers, have to be configured for processing all of the possible amplitude values, i.e. also the maximum amplitude values, relatively complex implementation, which requires a large chip area and thus entails additional costs, is in this case necessary. It is therefore desirable to reduce the crest factor, in particular the maximum amplitude.

In addition to methods that reduce the maximum amplitude at the cost of a disturbance of the signal, methods that use one or more of the carrier frequencies in order to modify the transmission signal such that the maximum amplitude is reduced are also known in this regard. The carrier frequencies used for this purpose may not be used, or may be used only partially, for the actual data transmission.

U.S. Pat. No. 6,424,681 B1, for example, discloses a method for reducing the crest factor using a plurality of carrier frequencies. These carrier frequencies are preferably distributed uniformly over the total usable frequency range. A standardized correction signal, known as a kernel, which exhibits as "Dirac-like" a form as possible, i.e. substantially comprises a single maximum, is generated from these carrier frequencies. In order to correct a transmission signal, the phase and the amplitude of this correction signal are adapted using a suitable scaling factor. The correction signal thus adapted is deducted from the transmission signal, in a manner that may be iteratively repeated in order to reduce a plurality of peak values of the transmission signal.

U.S. Pat. No. 6,529,925 B1 discloses a method for reducing a crest factor in which only the Nyquist frequency, i.e. the final frequency of the inverse Fourier transformation, which in ADSL systems is not used for data transmission, is used as a carrier frequency for the correction. However, as only a single carrier frequency is used for the correction, the capacity of this method is limited. This method may also not be applied to VDSL signals, as the Nyquist frequency is, in this case, outside the usable frequency range, both for downstream and for upstream transmission.

In the case of VDSL systems, in particular, there is the further problem that, at 8,192 sampled values, the frame length, i.e. the number of sampled values in a DMT frame, is very large, and a correction signal or a correction vector comprising 8,192 sampled values must accordingly also be calculated, and this is relatively complex.

SUMMARY

It is therefore an object of the present invention to provide a method and a device for reducing the crest factor of a signal, wherein a crest factor of VDSL signals and other DMT-modulated signals having a large frame length is, in particular, to be reduced with as low computational costs as possible.

This object is achieved by a method and a device according to embodiments of the present invention.

According to a first embodiment, a method is proposed for reducing the crest factor of a signal, wherein a correction signal is generated as a combination of a plurality of partial correction signals having respectively predetermined frequencies and the correction signal is subtracted from the signal in order to generate a corrected signal having a reduced crest factor. The respectively predetermined frequencies are selected such that the correction signal, which has a period length that is shorter than a length of the signal, is periodic. In order to generate the correction signal, a period of the correction signal is then determined and the correction signal determined as a periodic continuation of the one period.

Only one period of the correction signal therefore has to be determined, and this significantly reduces the computational complexity for determining the correction signal. The period length of the correction signal may, in particular, be the length of the signal divided by an integer.

The signal may be a digital signal having a predetermined number N of sampled values. N may, in particular, be $2^n$. In this case, the respectively predetermined frequencies are preferably selected in the form $2^\lambda \cdot v \cdot f_0$, wherein $\lambda$ and $v$ are integers, $\lambda < n$, and $f_0$ is a predetermined frequency spacing.

All of the partial correction signals therefore exhibit a period length $2^{n-\lambda}$.

At least one auxiliary signal, which exhibits a length of a period of the correction signal and contains maximum and/or minimum values of the signal, may be determined for determining the partial correction signals, and thus the correction signal. The period of the correction signal is then first of all determined for correcting this at least one auxiliary signal.

An amplitude and a phase of the partial correction signals may, in particular, be determined such that a maximum of the partial correction signals corresponds to a maximum absolute amplitude of the at least one auxiliary signal. A partial correction signal thus determined may then be subtracted from the at least one auxiliary signal in order to determine a new at least one auxiliary signal for a further iteration step, which may then ensue.

However, it is, in principle, also possible to determine an intermediate correction signal, which, if possible, exhibits only one distinct maximum, from the plurality of partial correction signals having the respectively predetermined frequencies, and to determine the period of the correction signal by means of phase-shifting and amplitude-adaptation of this intermediate correction signal.

In order to take into account effects of a transmission filter or other units which process the corrected signal, the correction signal may be determined using a model of the transmission filter or the corresponding units, so that effects of the transmission filter on maximum values of the signal may be taken into account.

The invention will be described below in greater detail on the basis of a preferred embodiment and with reference to the accompanying drawings.

DETAILED DESCRIPTION

Figure 1:
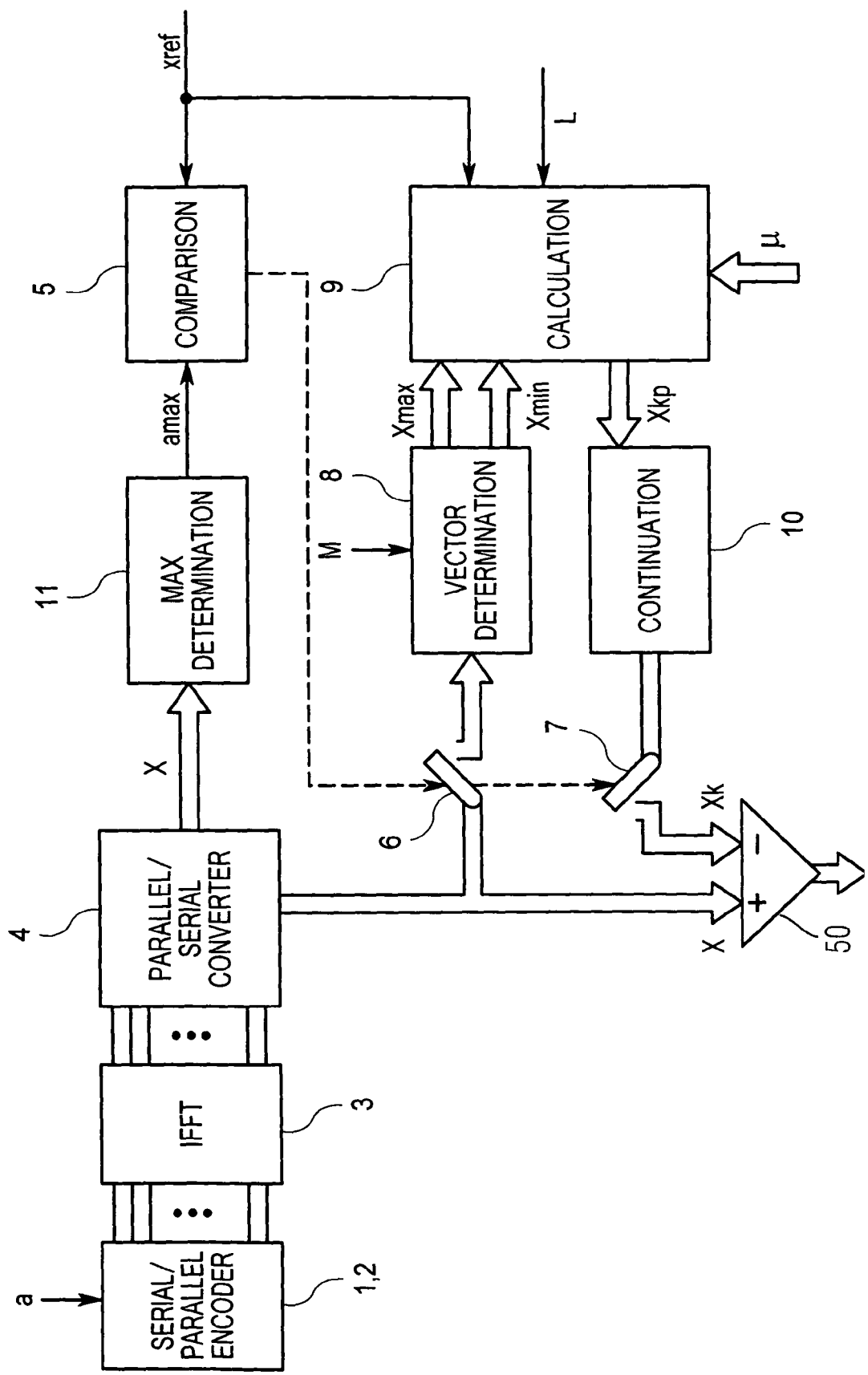
FIG. 1 shows an embodiment of a device according to the invention for reducing a crest factor.

As has already been explained in the introduction to the description, in the case of multi-carrier modulation methods such as discrete multitone modulation (DMT), data is modulated in parallel to a plurality of carrier frequencies or tones, and sampled values of a transmission signal are then generated by means of an inverse Fourier transformation. In the case of methods such as ADSL or VDSL, in which adjacent carrier frequencies exhibit a constant frequency spacing $f_0$, the carrier frequencies may be written in the form $\mu \cdot f_0$, wherein $\mu$ is a number of the respective carrier frequency or the respective carrier. The value $\mu$ will be used below as a general designation of the carrier frequencies.

As in the case of the methods described in the introduction to the description for reducing the crest factor of a signal, a number of carrier frequencies are also used for correcting the signal in the case of the method according to the invention described below, i.e. the amplitude and phase of the corresponding carriers are not modulated for transmitting data, but rather determined such that the crest factor of the signal is reduced as far as possible. These carrier frequencies used for the purpose of correction will also be referred to below as correction frequencies.

As was described in the introduction to the description, what is known as a DMT frame comprising N sampled values of a transmission signal is generated during the discrete multitone modulation. These N sampled values may be written as a vector X comprising the sampled values as components $x(k)$, $k=1 \ldots N$, i.e.

$$X = [x(1), x(2), \ldots, x(N)]^T \quad (1)$$

Generally, vectors will be denoted below using capital letters and the components thereof using lower-case letters.

A partial correction signal based on a carrier frequency $\mu$ may be written as a vector $Xk^{(\mu)}$ comprising components $$xk^{(\mu)}(k) = c_\mu \cdot \cos\left(2\pi\mu \frac{k-1}{N} + \varphi_\mu\right) \quad (2)$$

wherein $\mu$ represents the number of the respective correction frequency or the number of the respective correction carrier, $c_\mu$ represents an amplitude and $\varphi_\mu$ a phase of the partial correction signal. k corresponds to the number of the respective sampled value, and thus substantially to time, as the sampled values are transmitted successively in terms of time.

A correction vector Xk for reducing the crest factor of the vector X is then produced as the superposition of the partial correction vectors, i.e.

$$Xk = \sum_\mu Xk^{(\mu)}, \quad (3)$$

wherein µ is added over all of the frequencies used for the purpose of correction.

According to the invention, the correction frequencies are then selected such that the correction vector Xk is periodically smaller by one period than the number N of the elements x (k) of the vector X.

In the case of the preferred embodiment of the discrete multitone modulation, advantage may be taken of the fact that N is always a power of two, i.e.

$$N=2^n \quad (4)$$

wherein n is a natural number, as results from the inverse fast Fourier transformation or the fast Fourier transformation used, as described in the introduction to the description, in the discrete multitone modulation. If the correction frequency is then selected such that $$\mu = 2^\lambda \cdot \nu \quad (5)$$

applies, wherein λ and µ are natural numbers, $$xk^{(\mu)}(k) = c_\mu \cos\left(2\pi 2^\lambda \nu \frac{k-1}{2^n} + \varphi_\mu\right) \quad (6)$$

or $$xk^{(\mu)}(k) = c_\mu \cos\left(2\pi \nu \frac{k-1}{2^{n-\lambda}} + \varphi_\mu\right). \quad (7)$$

are produced as the components of the vector $Xk^{(\mu)}$.

As is apparent from equation (7), the partial correction vector $Xk^{(\mu)}$ is periodic, i.e. the components of the partial correction vector $Xk^{(\mu)}$ are repeated by the period $M=2^{n-\lambda}$. If, accordingly, only correction frequencies according to equation (5) are selected, this period shall apply for all of the partial correction vectors $Xk^{(\mu)}$, and therefore also for the correction vector Xk. Only one period, i.e. M values of the correction vector Xk, therefore has to be calculated; the total correction vector may then be determined by means of periodic continuation of these values. The computational costs for determining the correction vector are therefore significantly reduced, in particular in systems, for example VDSL systems, in which n is large.

It will be demonstrated below, on the basis of a preferred embodiment, how a correction vector of this type may be determined in a selection of carrier frequencies according to equation (5). FIG. 1 shows a device according to the invention for this purpose. Elements that perform an identical or corresponding function to elements in FIG. 13, which was described in the introduction to the description, are denoted by identical reference numerals.

Figure 13:
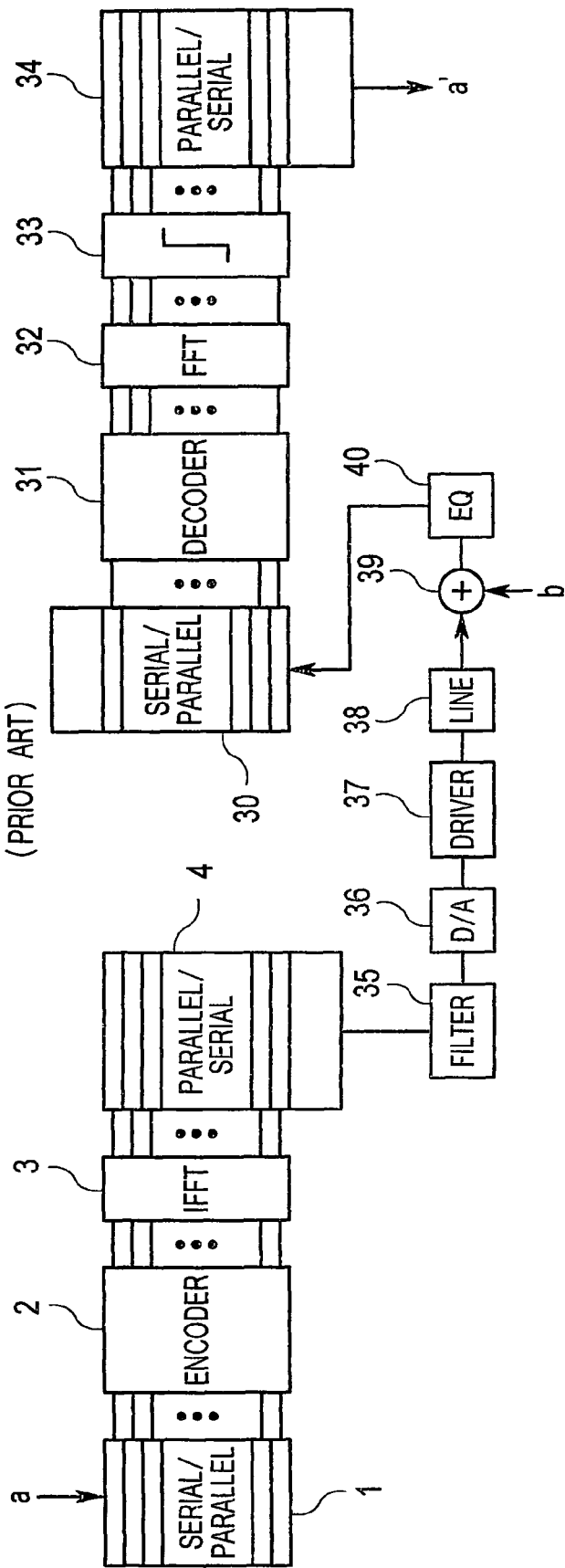
FIG. 13 shows a communication device according to the prior art.

In particular, in the case of the device in FIG. 1, just as in the device of FIG. 13, a serial digital data stream a is supplied to a serial/parallel converter 1, which divides the serial digital data stream a into data packets comprising N/2 sub-packets, wherein, in accordance with equation (4), N exhibits the form $2^n$. In the case of discrete multitone modulation using the quadrature amplitude modulation method, a respective sub-packet of a data packet is modulated in parallel to an individual carrier having a predetermined carrier frequency in an encoder 2, which, in this case, is shown as one block together with the serial/parallel converter 1. A first digital signal vector thus generated is supplied to a device 3 for carrying out an inverse Fourier transformation, in which the signal vector X from equation (1) is generated by means of an inverse Fourier transformation, in particular an inverse fast Fourier transformation (IFFT). Said signal vector is supplied to a parallel/serial converter 4, which issues the elements x (k) of the signal vector X.

The signal vector X is supplied to maximum-determining means 11, which determine a maximum amax of the amounts of the values of the vector X, i.e.

$$a\text{max} = \max\{|x(k)|\}; k=1\ldots N \quad (8)$$

In the terms of this application, curly brackets always denote a set of values, i.e. $\{|x(k)|\}$ represents $$\{|x(1)|, x(2)|, \ldots, |x(N)|\}.$$

This maximum value amax is compared in comparison means 5 with a predetermined reference value xref. If amax is less than xref, there is no need to generate a correction vector, as amax, which represents a peak value of the signal vector X, is within predetermined bounds. In this case, the comparison means 5 therefore activate switches 6, 7 such that the switches 6, 7 are opened. A correction vector Xk is not generated in this case, so no correction of the signal vector X is carried out in a subtracter 50 and the signal vector X is issued directly.

It should be noted that the switches 6, 7 do not have to be physical switches. The maximum-determining means 11, the comparison means 5 and the means, which will be described below, for calculating the correction vector Xk may, for example, also be configured within a digital signal processor or the like. In this case, opening of the switches 6, 7 means that no correction vector Xk is calculated, whereas if the switches 6, 7 are closed, the calculation is carried out.

If, on the other hand, amax is greater than xref, the comparison means 5 activate the switches 6 and 7 such that they are closed. The signal vector X is accordingly supplied to vector-determining means 8 via the closed switch 6. The period length M, which, as described above, is $2^{n-\lambda}$, is also supplied to the vector-determining means 8. In the vector-determining means 8, two vectors, Xmax and Xmin, comprising respective M elements are determined such that for the components xmax (k), k=1 . . . M of the vector Xmax, the following applies:

$$x\text{max}(k) = \max\{x(k+jM)\}; \quad j=0\ldots\left(\frac{N}{M}-1\right); \quad k=1\ldots M \quad (9)$$

i.e. each element of the vector Xmax is the maximum of those values of the vector X that are located in each period M at a point corresponding to the respective element.

The vector Xmax may be determined in that the first M values of the vector X are initially taken over as starting values for the vector Xmax. The values of the vector Xmax are then compared in sequence with the second M values of the vector X. If a value of the second M values is greater than the corresponding value of the vector Xmax, then this value is taken over into the vector Xmax instead of the previously provided value. This process is continued with the following M values of the vector X until the end of the vector X is reached.

Elements xmin (k) of the vector Xmin, k=1, ..., M, according to $$xmin(k) = \min\{x(k+jM)\}; \quad j = 0\ldots\left(\frac{N}{M}-1\right); \quad k=1\ldots M \tag{10}$$

are accordingly determined, for which purpose a similar method may be used to that for the vector Xmax.

It should be noted that in this case—in contrast to equation (8)—the amount values of the elements of the vector X are considered, so the vector Xmax will generally contain positive values and the vector Xmin negative values. The value amax may then correspond either to the largest value of the vector Xmax or the smallest value of the vector Xmin.

Figure 2:
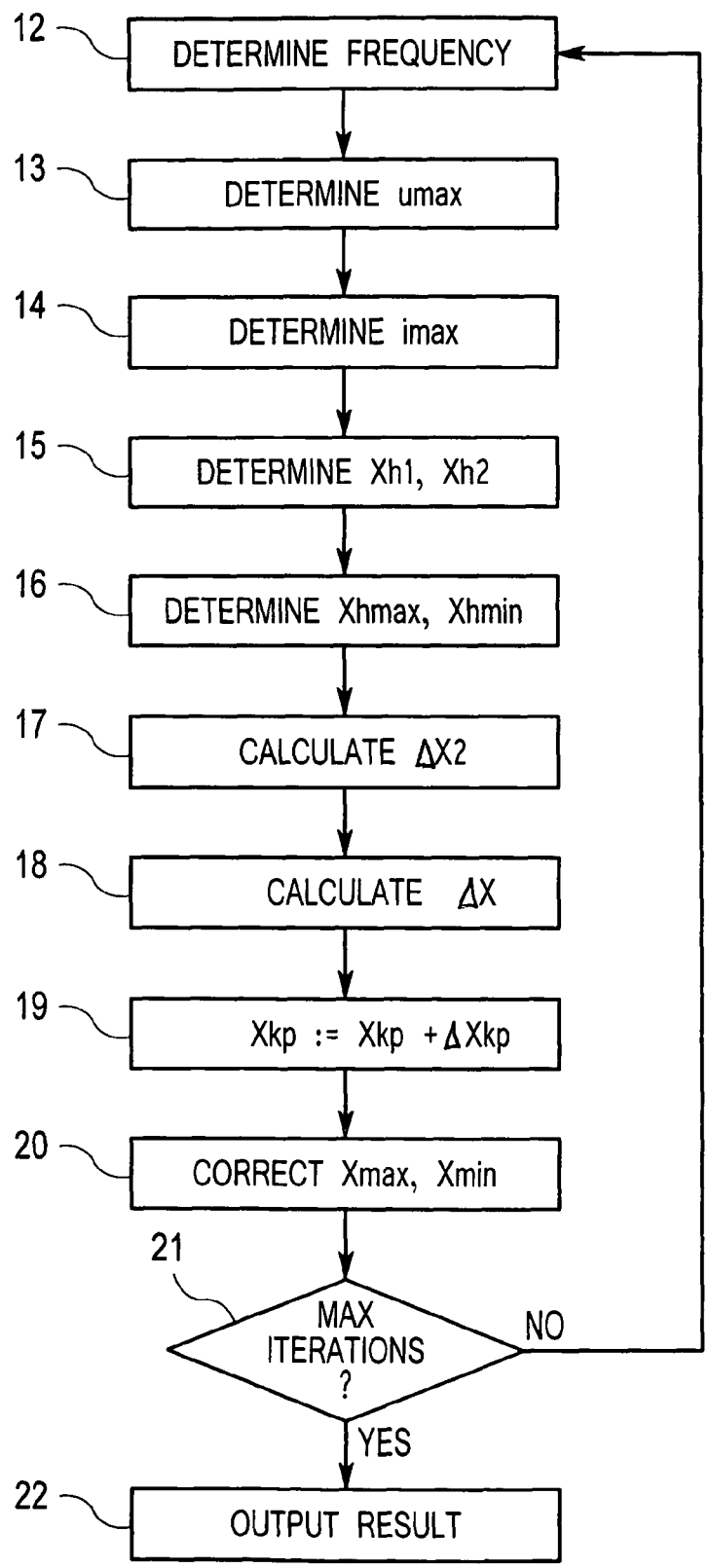
FIG. 2 is a flow chart of a method according to the invention for reducing a crest factor.

A period of the correction vector Xk, referred to hereinafter as Xkp, is calculated in the calculation means 9 on the basis of the vectors Xmax and Xmin. FIG. 2 shows a flow chart for the calculation according to the invention of Xkp.

This method, as will be demonstrated below, is an iterative method, as there is no closed mathematical solution with which an optimal correction vector, which produces a minimum maximum amount of the elements of the vectors Xmax and Xmin once the correction vector has been deducted from said vectors, may be obtained. However, it is possible to specify a lower bound for an achievable peak value with which the capacity of the method according to the invention may be monitored. However, this theoretically achievable value will be achievable or non-achievable depending on which frequencies μ are provided for the correction.

If imax designates a position of the largest, in terms of amount, element of the vectors Xmax and Xmin in the respective vector, $$xmin(imax) = \max\{|xmin(k)|; |xmax(k)|\} \text{ or}$$

$$xmax(imax) = \max\{|xmin(k)|; |xmax(k)|\}; k=1\ldots M \tag{11}$$

the following shall apply for a lower bound xmaxopt of the maximum value of the vector Xmax after correction:

$$xmaxopt = xmax(imax) - \frac{1}{2}(xmax(imax) + xmin(imax)), \tag{12}$$

whereas for an upper bound xminopt for a minimum value of the vector Xmin after correction $$xminopt = xmin(imax) - \frac{1}{2}(xmax(imax) + xmin(imax)) \tag{13}$$
$$= -xmaxopt$$

shall apply, wherein xmaxopt>0 and xminopt<0, and xmaxopt and xminopt are identical in terms of amount.

In order to determine a period Xkp of the correction vector Xk in the calculation means 9 from FIG. 1, a correction frequency to be processed is then initially predetermined in step 12 of the method from FIG. 2, wherein this correction frequency μ satisfies equation (5). It may be predetermined on the basis of a sequence of frequencies stored in a memory and used for the correction. For example, the correction frequencies μ to be used may be stored in a memory having an address range from 1 to Nk, wherein Nk is a number of correction frequencies to be used.

In step 13, a largest, in terms of amount, value umax of the vectors Xmax and Xmin is then determined, i.e.

$$umax = \max\{|xmax(k)|; |xmin(k)|\} = \max\{xmax(k); -xmin(k)\}; k=1\ldots M \tag{14}$$

In a first iteration, the value |u max| corresponds to the value amax from equation (8).

In a step 14, a position imax of this maximum, i.e. the position at which the largest, in terms of amount, value umax in the vector Xmax or Xmin occurs, is then determined:

$$Imax = \text{Position of } (umax) \tag{15}$$

In step 15, two auxiliary vectors Xh1 and Xh2 comprising components xh1 (k) and xh2 (k) respectively are determined according to $$xh1(k) = xmax(k)\cos\left(2\pi\mu\frac{k-imax}{N}\right) \tag{16}$$
$$xh2(k) = xmin(k)\cos\left(2\pi\mu\frac{k-imax}{N}\right)$$
$$k = 1\ldots M$$

The auxiliary vectors are therefore obtained by multiplying the elements of the vectors Xmax and Xmin by the values of a cosine function having a frequency μ, which was predetermined in step 12, the cosine function being displaced by imax, so the largest, in terms of amount, value umax still occurs at the same point, as for k=imax, the cosine functions assume the value 1.

In order to reduce configurational complexity, it is also possible to use only the signs of the cosine function, i.e.

$$xh1(k) = xmax(k)\,\text{sgn}\left[\cos\left(2\pi\mu\frac{k-imax}{N}\right)\right] \tag{17}$$
$$xh2(k) = xmin(k)\,\text{sgn}\left[\cos\left(2\pi\mu\frac{k-imax}{N}\right)\right]$$
$$k = 1\ldots M.$$

No "real" multiplications are required in this case; rather, merely the sign has to be adapted. The values of the cosine function or just the signs may be stored in advance, M values being required for each correction frequency μ. The calculation is sped up as a result.

In step 16, a maximum value xhmax and a minimum value xhmin of the auxiliary vectors Xh1, Xh2 are determined according to $$xhmax = \max\{xh1(k); xh2(k)\}$$

$$k=1\ldots M$$

$$xhmin = \min\{xh1(k); xh2(k)\} \tag{18}$$

the sign being taken into account in this case, too, so xhmin will generally be a negative value. A first correction amplitude Δx1 is determined according to $$\Delta x1 = \frac{1}{2}(xhmax + xhmin), \tag{19}$$

from the values xhmax and xhmin.

In step 17, a second correction amplitude Δx2 is calculated according to $$\Delta x2 = \frac{1}{2}(\max\{x\max(k)\} + \min\{x\min(k)\}) \quad (20)$$

This second correction amplitude Δx2 is accordingly calculated from the maximum value of the vector Xmax and the minimum value of the vector Xmin. The use of this second correction amplitude Δx2 improves the convergence behaviour of the method. However, in principle, it is also possible to omit step 17, and this leads to a reduction in computational complexity, albeit with slightly worsened convergence behaviour.

In step 18, a total correction amplitude Δx is calculated according to $$\Delta x = \Delta x1 \cdot g1 + \Delta x2 \cdot g2 \quad (21)$$

g1 and g2 being weighting factors. The factors ½ from equations (19) and (20) may, of course, be combined with the weighting factors g1 and g2. The weighting factors may be kept at a constant value, for example 1 or ½, or be reduced from iteration step to iteration step in order to achieve better convergence behaviour. Generally, g1 will be greater than g2, for example g1=0.75 and g2=0.1875.

A partial correction vector ΔXkp having components Δxkp (k) is then calculated by means of the total correction amplitude Δx according to $$\Delta xkp(k) = \Delta x \cdot \cos\left(2\pi\mu \frac{k - imin}{N}\right); k = 1 \ldots M \quad (22)$$

In step 19, the vector ΔXkp is added to the correction vector for a period Xkp of a preceding iteration step. The elements of the vector Xkp are initialised as 0 for a first iteration step.

$$Xkp := Xkp + \Delta Xkp \quad (23)$$

therefore applies.

Finally, in step 20, the vectors Xmax and Xmin are corrected by the partial correction vector ΔXkp n order to generate vectors Xmax, Xmin for a subsequent iteration step, i.e.

$$X\max := X\max - \Delta Xkp$$

$$X\min := X\min - \Delta Xkp \quad (24)$$

In step 21, it is checked whether a predetermined maximum number L of iterations, which may also be equal to 1 and which is submitted to the calculation means 9 from FIG. 1, has already been achieved. If this is not the case, a subsequent iteration, starting at step 12 and having a subsequent predetermined correction frequency and the new Xmax and Xmin values calculated in step 20, is begun. If this is not the case, the correction vector calculated iteratively in step 19 is issued in step 22 for a period Xkp as a result of the method and, as illustrated in FIG. 1, transmitted to continuation means 10.

In the method illustrated in FIG. 2, it may also be checked in step 13 whether the value umax is already smaller than the value xref. In this case, the method may be continued directly at step 22, i.e. the most recently determined vector Xkp is issued as a result.

It should also be borne in mind that the largest correction is generally carried out in a first iteration step, as a result of which the correction tone, the frequency μ of which is used in the first iteration step, is most powerful. It is therefore advantageous continuously to vary the processing sequence of the correction frequencies during operation of the device of FIG. 1. This may be carried out, if the correction frequencies are stored in the above-described manner in a memory having an address range of 1 to Nk, in that for each signal vector X to be corrected, a starting address for the correction frequencies is increased by 1, so a different correction frequency is taken as the starting point for each signal vector X. A uniform power distribution over the correction frequencies may thus be achieved.

In the continuation means 10 of FIG. 1, the correction vector Xk is determined by means of periodic continuation of the vector Xkp, i.e. N/M vectors Xkp are joined in sequence in order to form the vector Xk, as may be described by $$xk(k) = xkp(k \bmod M); k = 1 \ldots N \quad (25)$$

mod being the modulo operator, which produces a remainder of the corresponding division k/M. This vector Xk is then subtracted component-by-component in the subtracter 50 from the signal vector X, and the elements of the corresponding differential vector X-Xk are issued sequentially as values to be transmitted, i.e., in the case of an arrangement corresponding to the arrangement of FIG. 12, are issued to a transmission filter 35.

A further alternative for calculating the correction vector for a period Xkp, which requires lower computational costs (although it is slightly less efficient than the method described with reference to FIG. 2), will be described below. As in the case of the method of FIG. 2, a plurality of correction frequencies μ that satisfy equation (5), i.e. $\mu = 2^\lambda \cdot \nu$, are provided.

A standardized correction vector Xn comprising components xn (k), k=1 ... M is then calculated from these correction frequencies according to $$xn(k) = \frac{1}{Nk}\sum_{j=1}^{Nk} \cos\left(2\pi\mu(j) \cdot \frac{k}{N}\right) \quad (26)$$

Nk again being a number of the correction frequencies used for the purposes of correction, and μ(j) being the correction frequency having a number j, for example the correction frequency stored at address j in the above-described memory. This standardized correction vector Xn exhibits a maximum at k=0 and is periodic by the period length M, as the correction frequencies μ satisfy equation (5). A period of this standardized correction vector Xn, i.e. xn (0) to xn (M−1) or xn (1) to xn (M), is calculated in advance and stored in a memory. As in steps 13 and 14, values umax and imax corresponding to equations (14) and (15) are then determined. The value $$\Delta x = \frac{1}{2}(x\max(i\max) + x\min(i\max)) \quad (27)$$

is then calculated as the correction amplitude Δx. Δx corresponds to the maximum value by which the peak value of the signal vector X may, according to equations (12), (13), be reduced. A partial correction vector Δxkp comprising component Δxkp (k) is then calculated according to $$\Delta xkp(k) = \Delta x \cdot g \cdot xn((k-i\max) \bmod M); k = 1 \ldots M \quad (28)$$

g being a weighting factor. The expression (k−imax) mod M means that the values xn (k) is cyclically displaced (by means of the MOD operator) within the period M such that the maximum, which, in accordance with equation (26), is located at k=0, is displaced to k=imax, i.e. to the position of the peak value of the vector Xmax or Xmin.

As in steps 19 and 20 of the method from FIG. 2, the vector Xkp and the vectors Xmax and Xmin are then adapted for a subsequent iteration step according to equations (23) and (24). Additional iterations are then carried out up to a predetermined maximum number L of iterations, the weighting factor g advantageously being reduced from iteration step to iteration step. These additional iterations are advantageous, as, on the one hand, depending on the selection of the weighting factor g, a peak value may continue to be present at k=imax even after the first iteration and, on the other hand, peak values may occur at other positions as a result of the correction carried out.

In comparison to the method described with reference to FIG. 2, separate amplitudes and phases are not, in this case, calculated for each correction frequency $\mu$; instead, only one function, which corresponds to equation (26) and may be calculated and stored in advance, is calculated. The memory use is, in particular, independent of the number of correction frequencies used. On the other hand, in the calculation of the standardised correction vector Xn, the phases of the individual correction carriers having the respective correction frequencies are fixed to 0 and the amplitudes kept constant at $$\frac{1}{Nk},$$

as a result of which possible degrees of freedom are not utilised and the effectiveness of the method is reduced.

Figure 3:
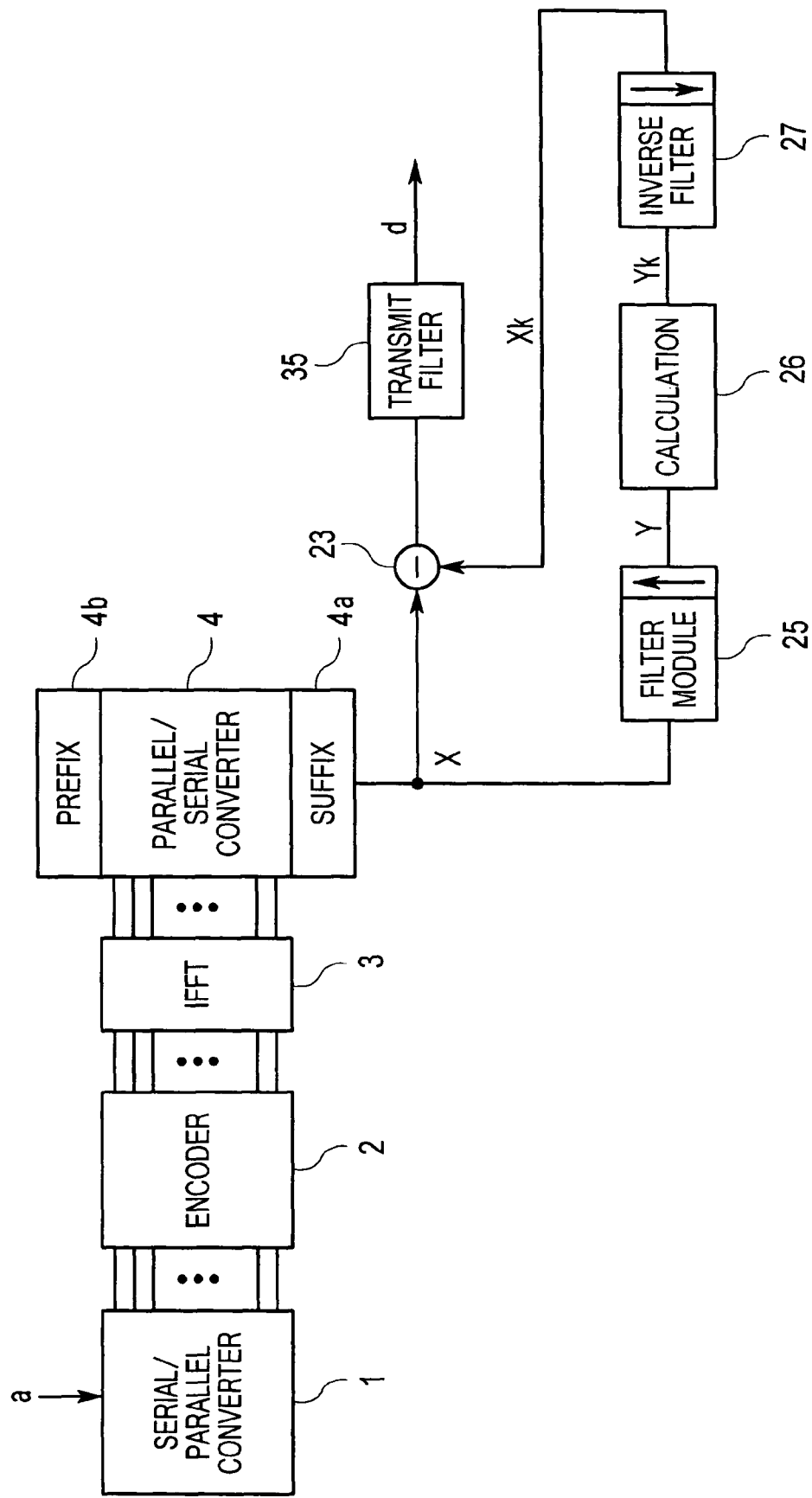
FIG. 3 shows an embodiment of a device according to the invention for reducing a crest factor, taking into account a transmission filter.

As described with reference to FIG. 1, the differential vector X-Xk is issued from the subtracter 50 and, for example, forwarded to a transmission filter in order to transmit the values of the vector X-Xk. This may give rise to the problem that—depending on the transmission function of the transmission filter—new peak values, which are not detected by means of the above-described methods, since these are based on the components of the signal vector X before the transmission filter, occur. FIG. 3 shows a modification of the device from FIG. 1, a transmission filter also being taken into account.

The blocks 1 to 4 correspond to the blocks 1 to 4 from FIG. 1, it being explicitly shown, in this case, that a prefix 4a and a suffix 4b are added to a DMT frame in the serial/parallel converter 4. What is known as a guard interval may also be inserted for separating successive signal vectors. In the case of FIG. 3, the prefix, suffix and DMT frame together form the vector X. This is, of course, also possible in the case of the device of FIG. 1.

In a similar manner as in FIG. 1, a correction vector Xk is subtracted from the signal vector X in a subtracter 23 for reducing a peak value, and the differential vector X-Xk formed by means of the subtracter 23 is supplied to a transmission filter 35, which generates a transmission signal d therefrom.

In order to generate the correction vector Xk, the signal vector X is supplied to a filter model 25, which is in the form of a digital filter, which simulates the properties of the transmission filter 35 as accurately as possible. In order to be able to detect as accurately as possible any peak values that may occur after the transmission filter 35, a higher sampling rate at the output of the filter model 25 than at the inlet of the filter model 25, i.e. a higher sampling rate than that of the signal vector X, is required. This is achieved by means of an interpolation or oversampling, which is indicated by the upward-pointing arrow in the filter model 25 in FIG. 3. The sampling frequency is generally increased by an integer value w, for example w=4. The precise value of w generally represents a compromise, since optimally precise detection of all of the peak values of a signal issued by the transmission filter 35 without using the correction vector Xk requires a sampling rate that is as high as possible, but, on the other hand, as the sampling rate increases, so too does the configurational complexity.

A filtered signal vector Y thus produced contains factor w-times more values than the signal vector X. As in the above-described methods, a correction vector Yk for the filtered signal vector Y, i.e. a correction vector that is based on correction tones having frequencies in accordance with equation (5) and reduces a peak value of the filtered signal vector Y, is generated in determination means 26. Both the method corresponding to FIG. 2 and the method described as an alternative, which uses the standardised correction vector from equation (26), may be used. As the filtered signal vector Y contains, as described above, factor w-times more values than the signal vector X, and this accordingly is also true of the correction vector Yk, the selection of the correction frequencies of the present invention according to equation (5) is, in this case in particular, highly effective, since, again, only one period of the correction vector Yk has to be calculated, and the vector Yk may then be formed by means of periodic continuation.

The correction vector Yk is then supplied to what is known as an inverse filter 27, the inverse filter 27 being configured such that, on the one hand, the vector Yk or the corresponding amplitude and phase values of the correction tones having the respective correction frequencies are converted into corresponding values of the vector Xk and, on the other hand, the sampling frequency is again lowered, as indicated by the downward-pointing arrow, by the factor w. For the purposes of this conversion, both an amplitude frequency response and a phase frequency response, i.e. substantially the transmission function of the filter model 25 for the various sampling phases, is taken into account in order to generate the correction vector Xk. The amplitudes and phases of the partial correction signals forming the correction vector Yk are substantially converted in accordance with the amplitude frequency response or the phase frequency response of the filter model 25.

The device illustrated in FIG. 3 therefore allows a correction vector Xk that facilitates optimal correction of the peak value of the transmission signal d after the transmission filter 35 to be determined.

The effectiveness of the method according to the invention will be demonstrated below on the basis of simulations. A VDSL system will accordingly be considered. According to the VDSL standard, a total of 4,097 frequency values ($\mu$=0, 1, . . . , 4,096) are in this case distributed equidistantly from the frequency 0 up to half the sampling frequency. A DMT frame thus has 8,192 signal values. The spacing of the carrier frequencies ($f_0$) is, as in the case of ADSL systems, 4.3125 kHz and the sampling frequency is therefore 35.328 MHz.

Figure 4A:
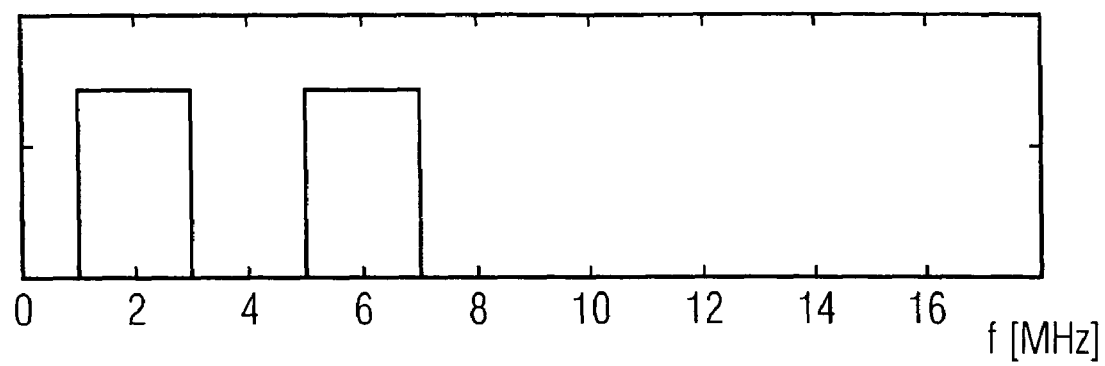
FIGS. 4A and 4B show frequency ranges of VDSL signals, FIG. 4A showing a downstream direction and FIG. 4B showing an upstream direction.
Figure 4B:
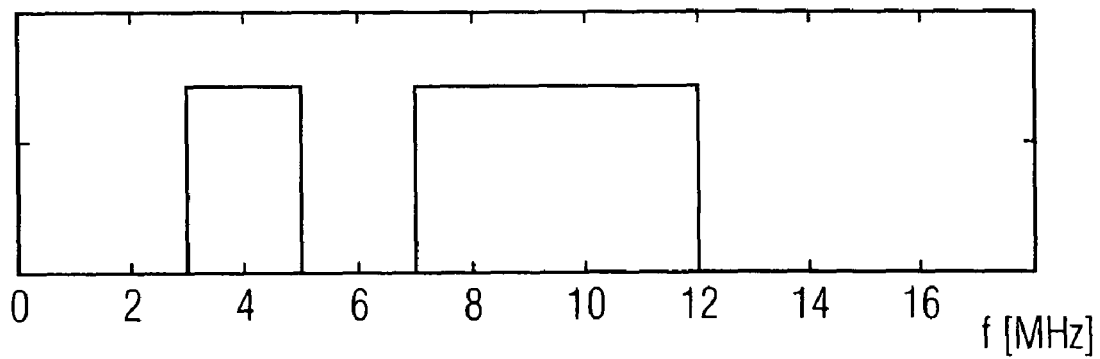

Various frequency ranges, which are illustrated in FIGS. 4A and 4B, are defined for data transmission in the downstream direction, i.e. from a central exchange to an end user, and in the upstream direction, i.e. from the end user to the central exchange, FIG. 4A showing the frequency ranges reserved for the downstream direction and FIG. 4B the frequency ranges reserved for the upstream direction. Carrier frequency numbers 257 to 695 and 1,182 to 1,634 are therefore provided for the downstream direction, the frequencies exhibiting the numbers 696 to 1,181 for the upstream direction, and 1,635 to 2,782 for the data transmission.

As, in the present example, N=8, 192=$2^{13}$, for a period length M=64, for example, the correction frequencies have to exhibit a frequency spacing of $2^8$=256 and, for a period length of M=64, a frequency spacing of $2^7$=128.

An example of data transmission in the downstream direction will be considered first. At a frequency spacing of 256 (or multiples thereof), only the carrier frequencies $\mu$=512, 1,280 and 1,536, and at a frequency spacing of 128, only the frequency values $\mu$=384, 512, 640, 1,280, 1,408 and 1,536 are located within the available ranges shown in FIG. 4A. No more than three different correction frequencies are therefore possible for a desired period length of the correction vector Xk of M=32, and no more than six different correction frequencies for M=64. A period length M=32 and the three possible carrier frequencies $\mu$=512, $\mu$=1,280 and $\mu$=1,536 were selected in the case of the simulation examples considered here.

Figure 5:
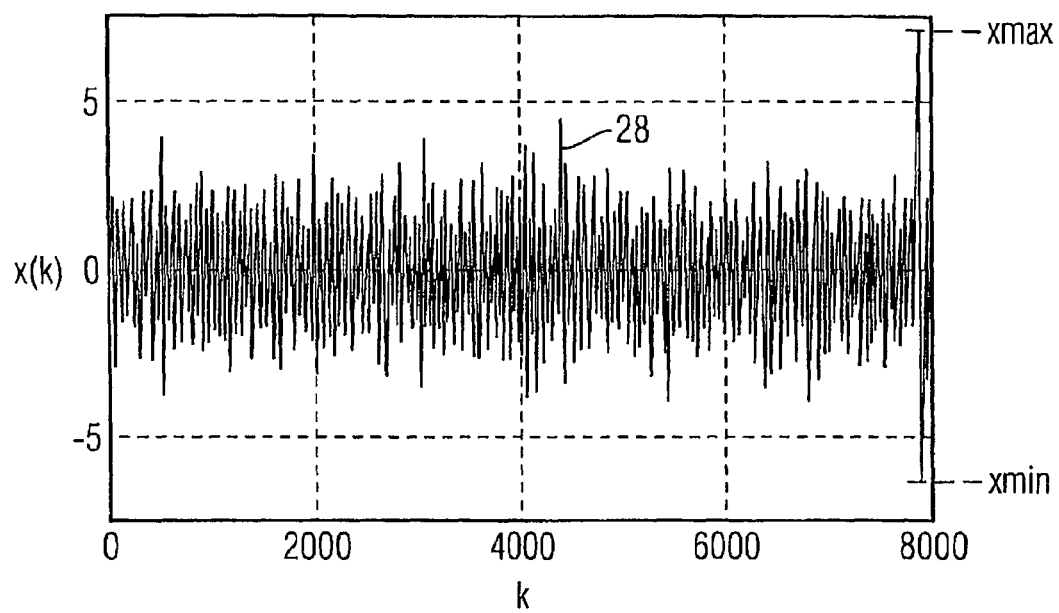
FIG. 5 shows sampled values of a DMT frame.

In FIG. 5, a curve 28 displays values of a DMT frame, i.e. a signal vector X, the elements x (k) of the vector X being plotted, in this case, over the index k. The illustrated DMT frame exhibits a very high peak value. Indeed, the occurring peak value, Xmax=6.34, is the largest peak value that occurred during a simulation period of over 600,000 DMT frames. Given that there are 8,192 values per DMT frame, this corresponds to a probability of this peak value occurring of approximately $2 \cdot 10^{-10}$. The minimal occurring value xmin in this frame is −5.6; a signal power of the signal was standardised to 1.

Figure 6:
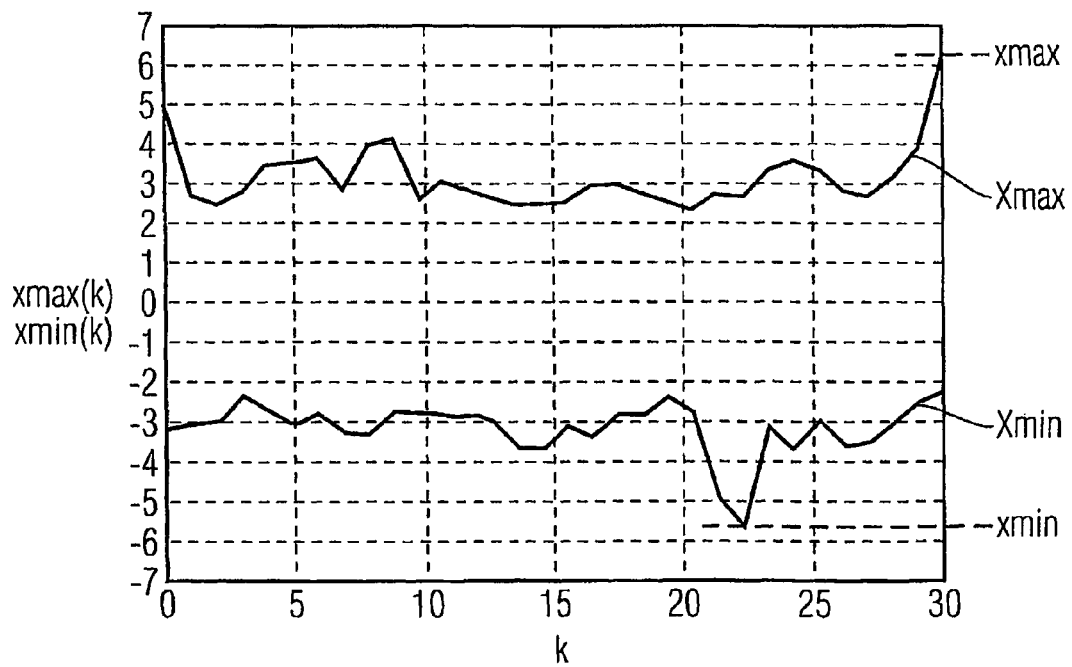
FIG. 6 shows maximum and minimum values of the sampled values from FIG. 5.

In FIG. 6, the values of the elements xmax (k), xmin (k), determined in accordance with equations (9) and (10), of the vectors Xmax and Xmin are plotted over the index k, k= 1 . . . 32. It may be seen that the maximum value xmax of the maximum vector Xmax and the minimum value xmin of the minimum vector Xmin are located at different positions within the period. At the position of the maximum value xmax of the vector Xmax, xmin (k) is −2.18. According to equation (12), the lower bound of the peak value that may, at best, be achieved is therefore 4.26.

Figure 7:
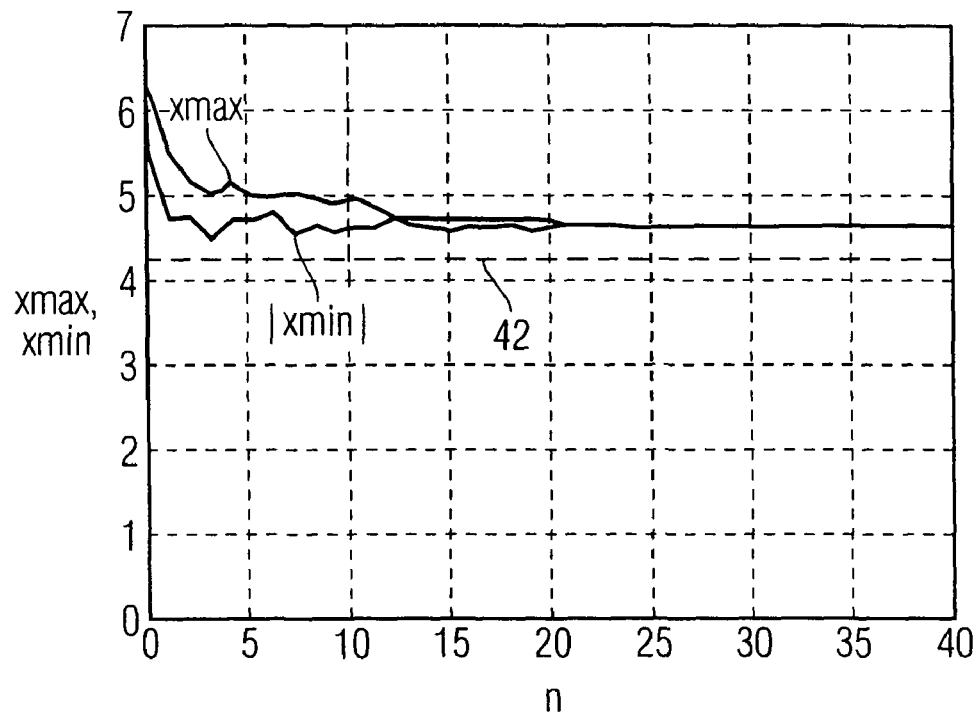
FIG. 7 shows maximum and minimum values of the signal from FIG. 5 as a function of a number of iterations of the method according to the invention.

FIG. 7 shows the effect of the method according to the invention of FIG. 2 on the maximum value xmax of the vector Xmax and the minimum value xmin of the vector Xmin, xmax and xmin being plotted, in terms of amount, over a number of iterations carried out in the method from FIG. 2. The weighting factors from equation (21) were g1=0.75 and g2=0.1875. Line 42 indicates the maximum achievable value 4.26. As may be seen, this theoretical limit value, which is, at best, possible with a periodic correction vector Xk of period length M=32, is not achieved with the correction frequencies used in this case. The minimum achievable value is, in this case, 4.66, corresponding to a reduction in the peak value of approximately 2.7 dB. This value is achieved after approximately 20 iteration steps.

Figure 8:
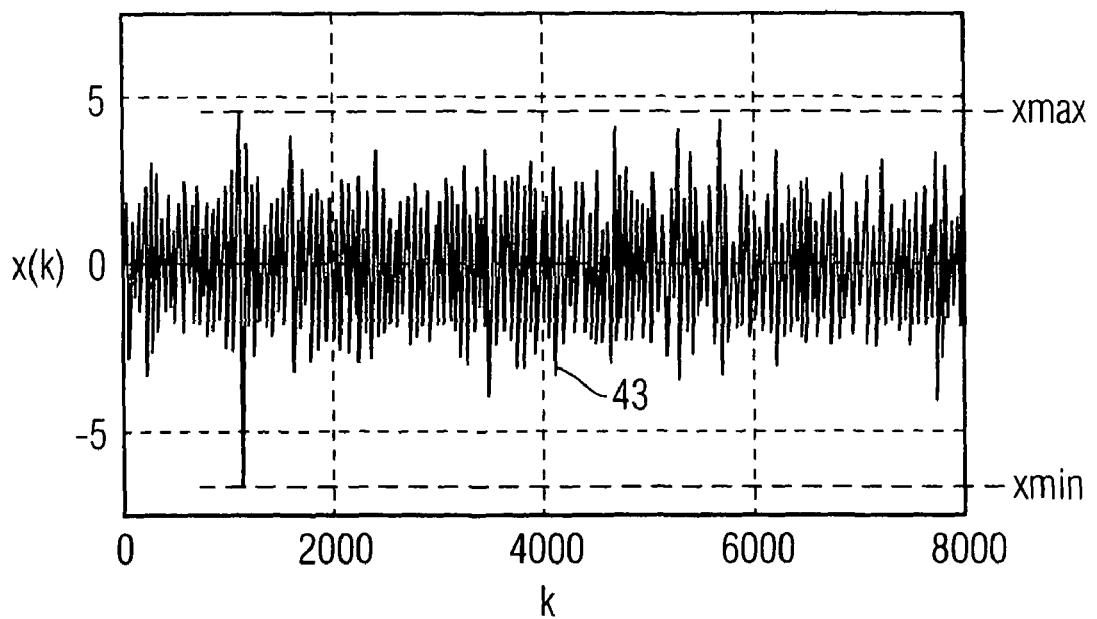
FIG. 8 shows sampled values of a further DMT frame.
Figure 9:
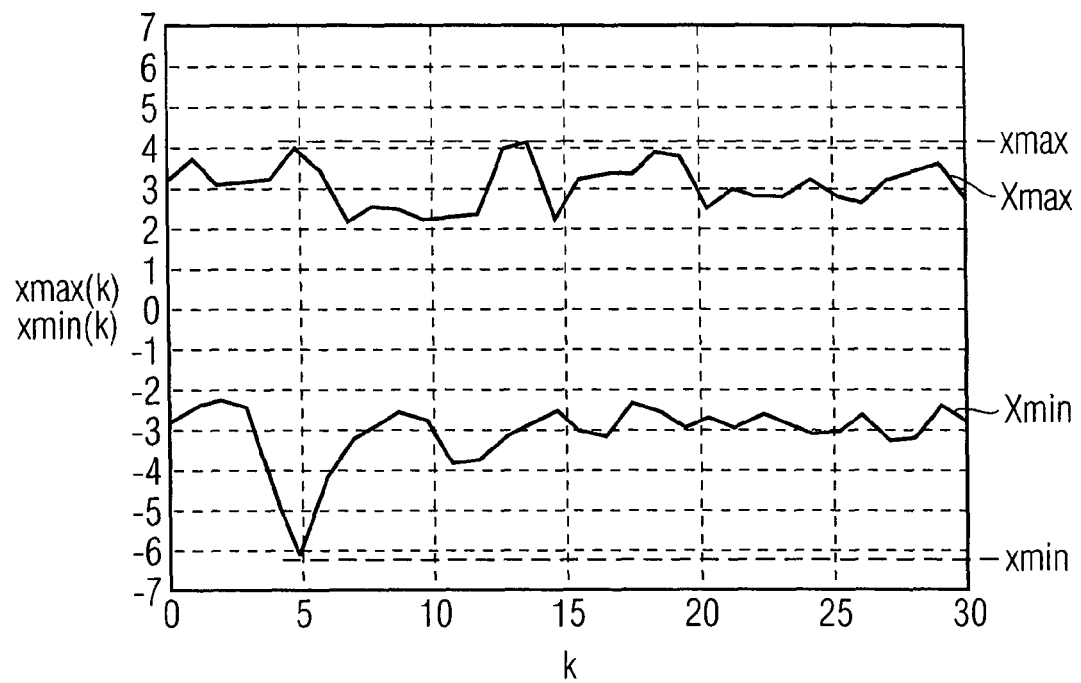
FIG. 9 shows maximum and minimum values of the sampled values from FIG. 8.
Figure 10:
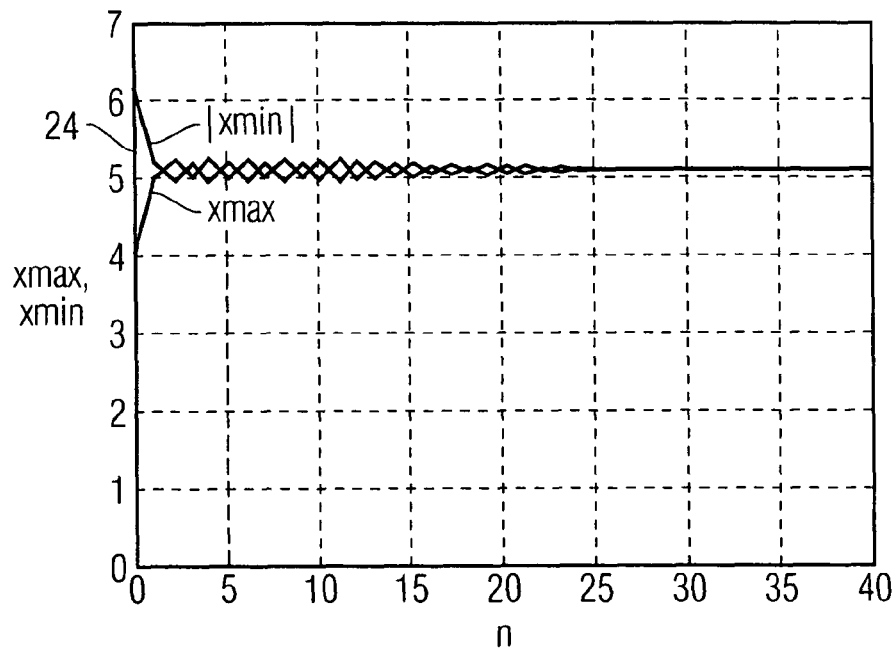
FIG. 10 shows maximum and minimum values of the sampled values from FIG. 8 as a function of a number of iterations of the method according to the invention.

FIG. 8 shows an additional DMT frame or elements x (k) of an additional signal vector X as curve 43. The absolute peak value is, in this case, the minimum value xmin=−6.2, and is therefore slightly lower than the peak value of the DMT frame of FIG. 5. The maximum value xmax is, in this case, 4.19. The corresponding vectors Xmax and Xmin are illustrated in FIG. 9, the illustration corresponding to that of FIG. 6. In contrast to the example of FIG. 5 to 7, there is, in this case, a relatively high value xmax (k) of 4.03 at the peak value xmin=−6.2. The limit value of the minimum achievable peak value is therefore, in this case, 5.12. The theoretically achievable reduction in the peak value is therefore lower in the case of this DMT frame than in the preceding case.

In an illustration corresponding to FIG. 7, FIG. 7 shows the characteristic of |x min| and xmax over the number of iterations carried out using the method from FIG. 2. Line 24 indicates the optimum achievable value, which, in this case, is indeed achieved using the method according to the invention. However, as this optimum achievable value is greater than in the example of FIG. 5 to 7, the reduction in the peak value is, in this case, 1.7 dB, and is therefore less than that for the DMT frame from FIG. 5.

Figure 11A:
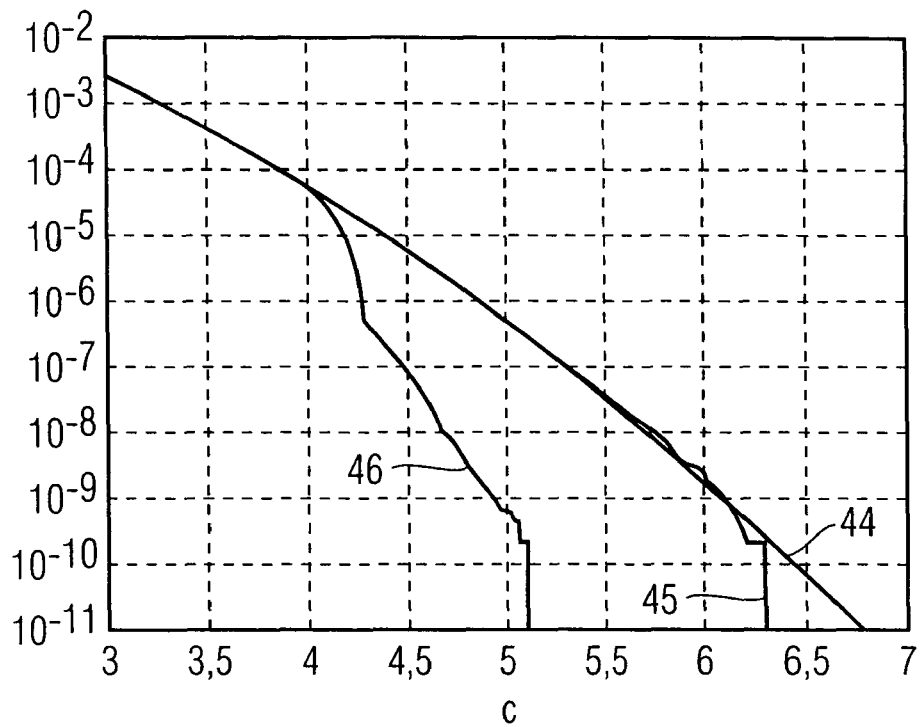
FIGS. 11A and 11B show simulation results of the method according to the invention in the downstream direction.
Figure 11B:
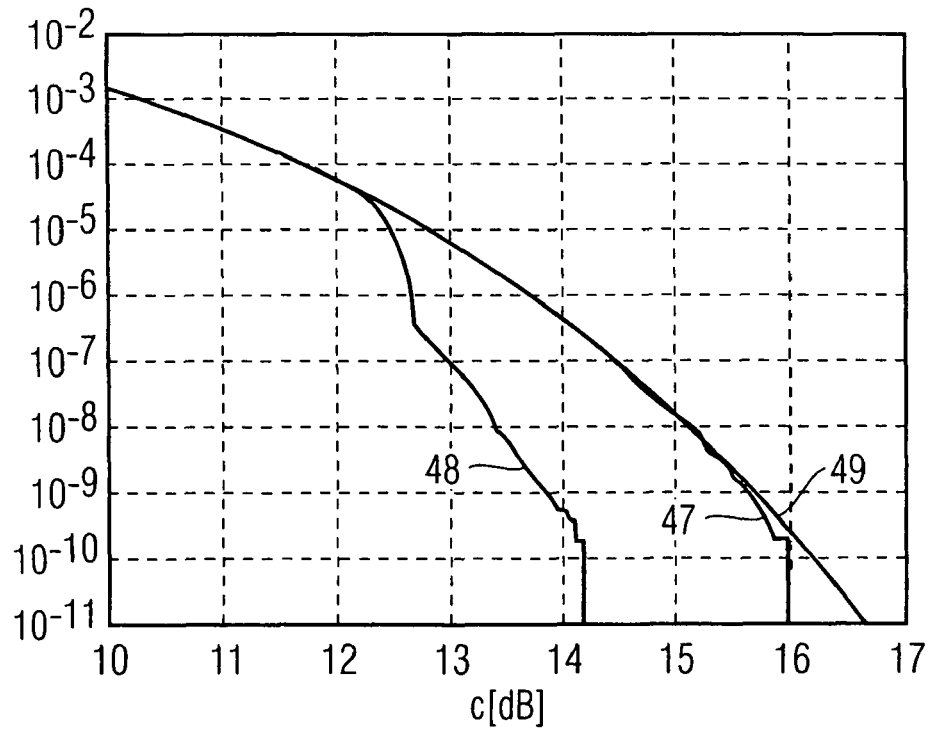
Figure 14:
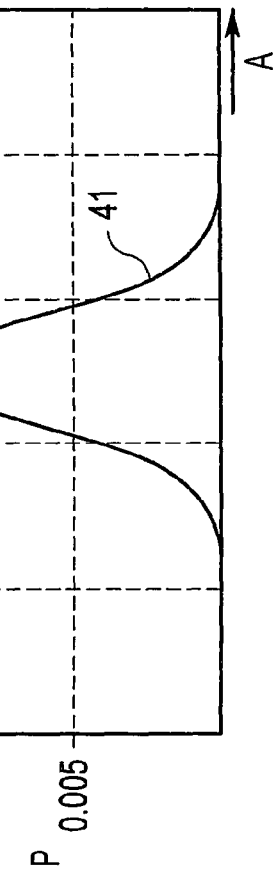
FIG. 14 shows a probability distribution of amplitude values during DMT modulation.

In the case of simulation over a large number of DMT frames (somewhat more than 600,000), the so-called clipping probabilities illustrated in FIGS. 11A and 11B are obtained. The clipping probability indicates the probability of a signal value of the DMT frame exceeding a specific value. In the case of the simulation, the signal was scaled to a transmission power of 1, as a result of which the clipping probability is also the probability of a specific crest factor c occurring, the crest factor c being illustrated in FIG. 11 as a signal value and in FIG. 11B in decibels. The probabilities are plotted, in each case, on the vertical axis. Curves 44 in FIGS. 11A and 49 in FIG. 11B indicate the characteristic of the clipping probability for a Gaussian distribution of the signal values corresponding to FIG. 14, curve 45 in FIG. 11A or 47 in FIG. 11B indicates the clipping probability without using the method according to the invention or the device according to the invention for reducing the crest factor, and curves 46 and 48 indicate the clipping probabilities using the method according to the invention. xref=4.3 was fixed as the limit value xref for activating the method according to the invention (cf. FIG. 1).

As may be seen from the figures, the clipping probabilities for crest factors above this value are significantly reduced by using the method according to the invention. The following table indicates the crest factors for selected probabilities, with and without the correction according to the invention.

| Clipping probability | c without correction | c with correction | c without correction in dB | c without correction in dB |
|---|---|---|---|---|
| $10^{-7}$ | 5.3 | 4.5 | 14.5 | 13.0 |
| $10^{-8}$ | 5.75 | 4.7 | 15.1 | 13.4 |
| $10^{-9}$ | 6.10 | 4.90 | 15.7 | 13.8 |

Finally, a further example of the use of the method according to the invention in the upstream direction will be illustrated. In this case, at a frequency spacing of 256 (M=64), six carrier frequencies ($\mu$=768, 1,024, 1,792, 2,048, 2,304 and 2,560) and at a frequency spacing of 128 (M=32), thirteen carrier frequencies ($\mu$=768, 896, 1,024, 1,152, 1,664, 1,792, 1,920, 2,048, 2,176, 2,304, 2,432, 2,560 and 2,688) are located within the frequency ranges provided, in accordance with FIG. 4B, for the upstream direction. A period length of M=32 and three correction frequencies, namely $\mu$=1,024, 2,048 and 2,560, were, again, selected as a simulation example. The simulation was carried out over more than 1.5 million DMT frames.

Figure 12A:
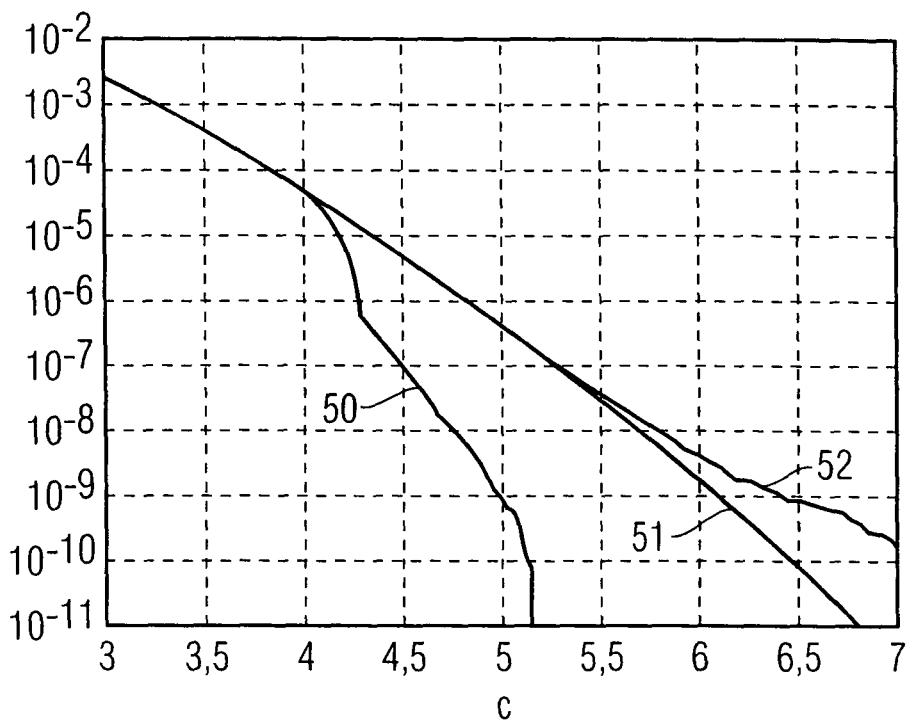
FIGS. 12A and 12B show simulation results of the method according to the invention in the upstream direction.
Figure 12B:
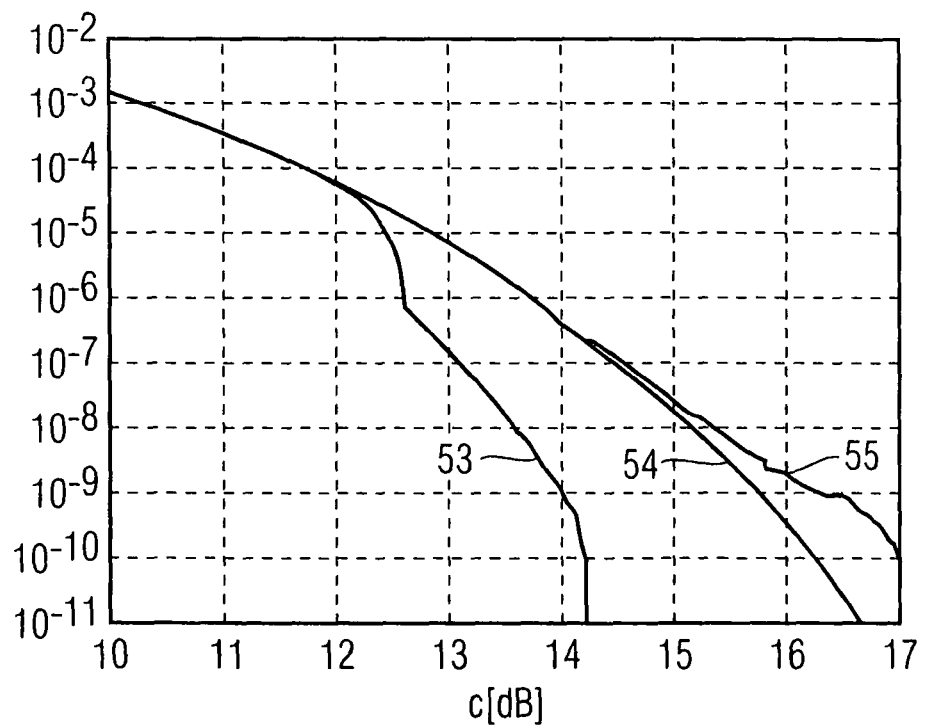

FIGS. 12A and 12B show corresponding simulation results, the illustration corresponding to that of FIGS. 11A and 11B. Curves 51 and 54 indicate the characteristic for a Gaussian distribution of the signal values, curves 52 and 55 the characteristic without the method according to the invention for reducing the crest factor, and curves 50 and 53 the characteristic of the probability using the method according to the invention. It should be noted that in the case of crest factors greater than approximately 5.5, the probabilities without the method according to the invention are higher than for a Gaussian process; this is due to marked correlations owing to the only partially used frequency band. A reduction of the crest factor is therefore even more important in the upstream direction than in the downstream direction.

The following table shows crest factors, again produced with corresponding probabilities:

| Clipping probability | c without correction | c with correction | c without correction in dB | c without correction in dB |
|---|---|---|---|---|
| $10^{-7}$ | 5.3 | 4.5 | 14.5 | 13.1 |
| $10^{-8}$ | 5.8 | 4.8 | 15.3 | 13.6 |
| $10^{-9}$ | 6.6 | 5.0 | 16.2 | 13.9 |

Depending on the probability, the method according to the invention results in a reduction in the crest factor by approximately 1.5 to 2 dB. In cases in which the clipping probabilities are above those of a Gaussian distribution, an even greater reduction in the crest factor is possible.

Modifications of the above-described methods are, of course, also possible. The correction vectors Xk may, in particular, also be generated in a manner other than that specified. It should also be noted that corresponding methods are, in principle, also possible for analog signals. The vector notation for the signals that has been used in the present description should, in particular, be understood as being purely illustrative, and not as entailing any limitation. Moreover, more correction frequencies may be used than in the illustrated simulation examples; although this increases the computational costs, it nevertheless leads to a more effective reduction in the crest factor.

The invention claimed is:

1. A method for reducing the crest factor of a signal, comprising:
   generating a correction signal as a combination of a plurality of partial correction signals having respectively predetermined frequencies;
   generating a corrected signal having a reduced crest factor by subtracting the correction signal from the signal,
     wherein the respectively predetermined frequencies are selected such that the correction signal, which has a period length shorter than a length of the signal, is periodic,
     wherein a period of the correction signal is determined, and
     wherein the correction signal is determined as a periodic continuation of the one period,
     wherein the signal is a digital signal comprising a predetermined number of N of sampled values;
   determining at least one auxiliary signal comprising M sampled values, wherein M corresponds to the period length; and
   reducing a peak value of the at least one auxiliary signal upon subtracting the one period of the correction signal from the at least one auxiliary signal by determining the one period of the correction signal;
     wherein the determining of the one period of the correction signal comprises:
     (i) setting the one period of the correction signal to 0,
     (ii) selecting a frequency from the respectively predetermined frequencies,
     (iii) determining a period of an intermediate partial correction signal having the frequency selected in step (ii) such that a peak value of the at least one auxiliary signal is reduced when the period of the intermediate partial correction signal is reduced from the at least one auxiliary signal,
     (iv) subtracting the period of the intermediate partial correction signal from the at least one auxiliary signal in order to generate the at least one auxiliary signal for a following iteration,
     (v) adding the period of the intermediate partial correction signal to the period of the correction signal,
     (vi) increasing a counter by 1, and
     (vii) continuing, in step (ii), to carry out the following iteration if the counter is less than a predetermined value.

2. The method according to claim 1, wherein the period length is equal to the length of the signal divided by an integer.

3. The method according to claim 1, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing.

4. The method according to claim 1, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing,
   wherein the at least one auxiliary signal comprises a first auxiliary signal $$x\max(k) = \max\{x(k+jM)\}; j = 0\ldots\left(\frac{N}{M} - 1\right); k = 1\ldots M$$

and a second auxiliary signal $$x\min(k) = \min\{x(k+jM)\}; j = 0\ldots\left(\frac{N}{M} - 1\right); k = 1\ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, {x(k+j−M)} representing the set of all of the sampled values x (k+jM) for all of the values j of the signal, and
wherein step (iii) comprises:
   determining a position imax of a largest, in terms of absolute value, sampled value of the first auxiliary signal and the second auxiliary signal in the first auxiliary signal or second auxiliary signal,
   forming a first intermediate auxiliary signal xh1 (k) and a second intermediate auxiliary signal xh2 (k) according to $$xh1(k) = x\max(k)\cos\left(2\pi\mu\frac{k - i\max}{N}\right)$$

$$xh2(k) = x\min(k)\cos\left(2\pi\mu\frac{k - i\max}{N}\right)$$

$$k = 1\ldots M,$$

wherin $\mu = 2^\lambda \cdot v$, determining a maximum value xhmax and a minimum value xhmin of the first intermediate auxiliary signal and the second intermediate auxiliary signal according to $$xh\text{max} = \max\{xh1(k); xh2(k)\}$$

$$k = 1 \ldots M$$

$$xh\text{min} = \min\{(xh1(k); xh2(k)\}$$

$\{xh1(k); xh2(k)\}$ being a set of all of the sampled values of the first and the second intermediate auxiliary signal, determining a partial amplitude $\Delta x1$ according to $$\Delta x1 = \frac{1}{2}(xh\text{max} + xh\text{min}),$$

determining an amplitude $\Delta x$ as a function of the partial amplitude $\Delta x1$, and determining the period of the intermediate partial correction signal according to $$\Delta xkp(k) = \Delta x \cdot \cos\left(2\pi\mu\frac{k - i\text{min}}{N}\right); k = 1 \ldots M$$

$\Delta xkp(k)$ being a sampled value of the period of the intermediate partial correction signal.

5. The method according to claim 1, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, $v$ being a natural number and $f_0$ being a predetermined frequency spacing, wherein the at least one auxiliary signal comprises a first auxiliary signal $$x\text{max}(k) = \max\{x(k + jM)\}; j = 0 \ldots \left(\frac{N}{M} - 1\right); k = 1 \ldots M$$

and a second auxiliary signal $$x\text{min}(k) = \min\{x(k + jM)\}; j = 0 \ldots \left(\frac{N}{M} - 1\right); k = 1 \ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, $\{x(k+j\cdot M)\}$ representing the set of all of the sampled values x (k+jM) for all of the values j of the signal, and wherein step (iii) comprises:

determining a position imax of a largest, in terms of amount, sampled value of the first auxiliary signal and the second auxiliary signal in the first auxiliary signal or second auxiliary signal, forming a first intermediate auxiliary signal xh1 (k) and a second intermediate auxiliary signal xh2 (k) according to $$xh1(k) = x\text{max}(k)sgn\left[\cos\left(2\pi\mu\frac{k - i\text{max}}{N}\right)\right]$$

$$k = 1 \ldots M,$$

$$xh2(k) = x\text{min}(k)sgn\left[\cos\left(2\pi\mu\frac{k - i\text{max}}{N}\right)\right]$$

wherein $\mu = 2^\lambda \cdot v$, determining a maximum value xhmax and a minimum value xhmin of the first intermediate auxiliary signal and the second intermediate auxiliary signal according to $$xh\text{max} = \max\{xh1(k); xh2(k)\}$$

$$k = 1 \ldots M,$$

$$xh\text{min} = \min\{xh1(k); xh2(k)\},$$

$\{xh1(k); xh2(k)\}$ being a set of all of the sampled values of the first and the second intermediate auxiliary signal, determining a partial amplitude $\Delta x1$ according to $$\Delta x1 = \frac{1}{2}(xh\text{max} + xh\text{min}),$$

determining an amplitude $\Delta x$ as a function of the partial correction amplitude $\Delta x1$, and determining the period of the intermediate partial correction signal according to $$\Delta xkp(k) = \Delta x \cdot \cos\left(2\pi\mu\frac{k - i\text{min}}{N}\right); k = 1 \ldots M$$

$\Delta xkp(k)$ being a sampled value of the period of the intermediate partial correction signal.

6. The method according to claim 4, wherein the amplitude $\Delta x$ is determined by multiplying the partial amplitude $\Delta x1$ by a weighting factor.

7. The method according to claim 4, wherein a further partial amplitude $\Delta x2$ is determined according to $$\Delta x2 = \frac{1}{2}(\max\{x\text{max}(k)\} + \min\{x\text{min}(k)\})$$

and the amplitude $\Delta x$ is determined according to $$\Delta x = \Delta x1 \cdot g1 + \Delta x2 \cdot g2$$

g1 and g2 being weighting factors.

8. The method according to claim 5, wherein the amplitude $\Delta x$ is determined by multiplying the partial amplitude $\Delta x1$ by a weighting factor.

9. The method according to claim 5, wherein a further partial amplitude $\Delta x2$ is determined according to $$\Delta x2 = \frac{1}{2}(\max\{x\text{max}(k)\} + \min\{x\text{min}(k)\})$$

and the amplitude $\Delta x$ is determined according to $$\Delta x = \Delta x1 \cdot g1 + \Delta x2 \cdot g2$$

g1 and g2 being weighting factors.

10. A method for reducing the crest factor of a signal, comprising:

generating a correction signal as a combination of a plurality of partial correction signals having respectively predetermined frequencies;

generating a corrected signal having a reduced crest factor by subtracting the correction signal from the signal, wherein the respectively predetermined frequencies are selected such that the correction signal, which has a period length shorter than a length of the signal, is periodic, wherein a period of the correction signal is determined, and wherein the correction signal is determined as a periodic continuation of the one period, wherein the signal is a digital signal comprising a predetermined number of N of sampled values;

determining at least one auxiliary signal comprising M sampled values, wherein M corresponds to the period length;

reducing a peak value of the at least one auxiliary signal upon subtracting the one period of the correction signal from the at least one auxiliary signal by determining the one period of the correction signal;

wherein the at least one auxiliary signal comprises a first auxiliary signal $$x\max(k) = \max\{x(k+jM)\}; j = 0 \ldots \left(\frac{N}{M} - 1\right); k = 1 \ldots M$$

and a second auxiliary signal $$x\min(k) = \min\{x(k+jM)\}; j = 0 \ldots \left(\frac{N}{M} - 1\right); k = 1 \ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, $\{x(k+j-M)\}$ representing the set of all of the sampled values x (k+jM) for all of the values j of the signal;

determining a period of a standardized correction signal by combining the partial correction signals with the respectively predetermined frequencies, wherein the determining of the period of the correction signal includes:

(i) setting the period of the correction signal to 0, (ii) determining a position imax of a largest, in terms of amount, sampled value of the first auxiliary signal and the second auxiliary signal in the first auxiliary signal or in the second auxiliary signal, (iii) cyclically displacing sampled values of the period of the standardized correction signal such that a maximum of the period of the standardized correction signal is located at the position imax, in order to obtain a cyclically displaced period, (iv) determining an amplitude as a function of the largest, in terms of absolute value, sampled value of the first auxiliary signal or the second auxiliary signal, (v) subtracting the cyclically displaced period multiplied by the amplitude from the at least one auxiliary signal in order to obtain a new at least one auxiliary signal for a following iteration, (vi) adding the cyclically displaced period multiplied by the amplitude to the period of the correction signal, (vii) increasing a counter by 1, and (viii) skipping to step (ii) for a following iteration if the counter is less than a predetermined value.

11. The method according to claim 10, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing, and wherein the period of the standardized correction signal is determined according to $$xn(k) = \frac{1}{Nk} \sum_{j=1}^{Nk} \cos\left(2\pi\mu(j) \cdot \frac{k}{N}\right)$$

Nk being a number of partial correction signals and $\mu(j)$ being the value $2^\lambda \cdot v$ for the respective partial correction signals.

12. The method according to claim 10, wherein the amplitude is calculated according to $$\Delta x = \frac{1}{2}(x\max(i\max) + x\min(i\max)).$$

13. The method according to claim 1, wherein the method is carried out only if an absolute maximum value of the signal is greater than a predetermined limit value.

14. The method according to claim 1, wherein the signal is a signal to be issued to a filter, wherein the signal is filtered using a model of the filter in order to generate a filtered signal, wherein the method according to claim 1 is carried out using the filtered signal as a signal in order to obtain an additional correction signal for the filtered signal, and in that the correction signal for the signal is determined as a function of the additional correction signal and as a function of a transmission function of the model of the filter.

15. The method according to claim 14, wherein the model increases a sampling rate of the signal.

16. The method according to claim 1, wherein the signal is a signal generated using the discrete multitone modulation method.

17. The method according to claim 1, wherein the signal is a Very High Bit Rate Digital Subscriber Line (VDSL) signal.

18. A device for reducing the crest factor of a signal, comprising:

means for generating a correction signal as a combination of a plurality of partial correction signals having respectively predetermined frequencies;

subtraction means for subtracting the correction signal from the signal in order to generate a corrected signal having a reduced crest factor, wherein the respectively predetermined frequencies are selected such that the correction signal, which has a period length that is shorter than a length of the signal, becomes periodic, wherein the means for generating the correction signal determine a period of the correction signal and determine the correction signal as a periodic continuation of the one period, wherein the signal is a digital signal comprising a predetermined number N of sampled values, wherein at least one auxiliary signal comprising M sampled values is determined, M corresponding to the period length, wherein the one period of the correction signal is determined such that, on subtraction of the one period of the correctional from the at least one auxiliary signal, a peak value of the at least one auxiliary signal is reduced, and wherein the determination of the one period of the correction signal comprises:

(i) setting the one period of the correction signal to 0, (ii) selecting a frequency from the respectively predetermined frequencies, (iii) determining a period of an intermediate partial correction signal having the frequency selected in step (ii) such that a peak value of the at least one auxiliary signal is reduced when the period of the intermediate partial correction signal is reduced from the at least one auxiliary signal, (iv) subtracting the period of the intermediate partial correction signal from the at least one auxiliary signal in order to generate the at least one auxiliary signal for a following iteration, (v) adding the period of the intermediate partial correction signal to the period of the correction signal, (vi) increasing a counter by 1, and (vii) continuing, in step (ii), to carry out the following iteration if the counter is less than a predetermined value.

19. The device according to claim 18, wherein the device is incorporated in a transmitter in order to reduce the crest factor of a signal to be transmitted by the transmitter.

20. The device according to claim 18, wherein the period length is equal to the length of the signal divided by an integer.

21. The device according to claim 18, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, $v$ being a natural number and $f_0$ being a predetermined frequency spacing.

22. The device according to claim 18, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, $v$ being a natural number and $f_0$ being a predetermined frequency spacing, wherein the at least one auxiliary signal comprises a first auxiliary signal $$x\max(k) = \max\{x(k+jM)\}; j = 0 \ldots \left(\frac{N}{M}-1\right); k = 1 \ldots M$$

and a second auxiliary signal $$x\min(k) = \min\{x(k+jM)\}; j = 0 \ldots \left(\frac{N}{M}-1\right); k = 1 \ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, {x(k+j−M)} representing the set of all of the sampled values x (k+jM) for all of the values j of the signal, and wherein step (iii) comprises:

determining a position imax of a largest, in terms of absolute value, sampled value of the first auxiliary signal and the second auxiliary signal in the first auxiliary signal or second auxiliary signal, forming a first intermediate auxiliary signal xh1 (k) and a second intermediate auxiliary signal xh2 (k) according to $$xh1(k) = x\max(k)\cos\left(2\pi\mu\frac{k-i\max}{N}\right)$$

$$k = 1 \ldots M,$$

$$xh2(k) = x\min(k)\cos\left(2\pi\mu\frac{k-i\max}{N}\right)$$

wherein $\mu = 2^\lambda \cdot v$, determining a maximum value xhmax and a minimum value xhmin of the first intermediate auxiliary signal and the second intermediate auxiliary signal according to xhmax=max{xh1(k); xh2(k)} k=1 ... M xhmin=min{xh1(k); xh2(k)}

{xh1(k); xh2 (k)} being a set of all of the sampled values of the first and the second intermediate auxiliary signal, determining a partial amplitude $\Delta x1$ according to $$\Delta x1 = \frac{1}{2}(xh\max + xh\min),$$

determining an amplitude $\Delta x$ as a function of the partial amplitude $\Delta x1$, and determining the period of the intermediate partial correction signal according to $$\Delta xkp(k) = \Delta x \cdot \cos\left(2\pi\mu\frac{k-i\min}{N}\right); k = 1 \ldots M,$$

$\Delta xkp(k)$ being a sampled value of the period of the intermediate partial correction signal.

23. The device according to claim 18, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, $v$ being a natural number and $f_0$ being a predetermined frequency spacing, wherein the at least one auxiliary signal comprises a first auxiliary signal $$x\max(k) = \max\{x(k+jM)\}; j = 0 \ldots \left(\frac{N}{M}-1\right); k = 1 \ldots M$$

and a second auxiliary signal $$x\min(k) = \min\{x(k+jM)\}; j = 0 \ldots \left(\frac{N}{M}-1\right); k = 1 \ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, {x(k+j−M)} representing the set of all of the sampled values x (k+jM) for all of the values j of the signal, and wherein step (iii) comprises:
determining a position imax of a largest, in terms of amount, sampled value of the first auxiliary signal and the second auxiliary signal in the first auxiliary signal or second auxiliary signal,
forming a first intermediate auxiliary signal xh1 (k) and a second intermediate auxiliary signal xh2 (k) according to $$xh1(k) = x\max(k) sgn\left[\cos\left(2\pi\mu\frac{k-i\max}{N}\right)\right]$$
$$k = 1 \ldots M,$$
$$xh2(k) = x\min(k) sgn\left[\cos\left(2\pi\mu\frac{k-i\max}{N}\right)\right]$$
wherein $\mu = 2^\lambda \cdot v,$ determining a maximum value xhmax and a minimum value xhmin of the first intermediate auxiliary signal and the second intermediate auxiliary signal according to $xh\max=\max\{xh1(k); xh2(k)\}$ k=1 ... M, $xh\min=\min\{xh1(k); xh2(k)\},$ {xh1(k); xh2(k)} being a set of all of the sampled values of the first and the second intermediate auxiliary signal,
determining a partial amplitude $\Delta x1$ according to $$\Delta x1 = \frac{1}{2}(xh\max + xh\min),$$

determining an amplitude $\Delta x$ as a function of the partial correction amplitude $\Delta x1$, and
determining the period of the intermediate partial correction signal according to $$\Delta xhp(k) = \Delta x \cdot \cos\left(2\pi\mu\frac{k-i\min}{N}\right); k = 1 \ldots M$$

$\Delta xkp(k)$ being a sampled value of the period of the intermediate partial correction signal.

24. The device according to claim 22, wherein the amplitude $\Delta x$ is determined by multiplying the partial amplitude $\Delta x1$ by a weighting factor.

25. The device according to claim 22, wherein a further partial amplitude $\Delta x2$ is determined according to $\Delta x2=1;2(\max\{x\max(k)\}+\min\{x\min(k)\})$ and the amplitude $\Delta x$ is determined according to $\Delta x=\Delta x1 \cdot g1+\Delta x2 \cdot g2$ g1 and g2 being weighting factors.

26. The device according to claim 23, wherein the amplitude $\Delta x$ is determined by multiplying the partial amplitude $\Delta x1$ by a weighting factor.

27. The device according to claim 23, wherein a further partial amplitude $\Delta x2$ is determined according to $$\Delta x2 = \frac{1}{2}(\max\{x\max(k)\} + \min\{x\min(k)\})$$

and the amplitude $\Delta x$ is determined according to $\Delta x=\Delta x1 \cdot g1+\Delta x2 \cdot g2$ g1 and g2 being weighting factors.

28. A device for reducing the crest factor of a signal, comprising:
means for generating a correction signal as a combination of a plurality of partial correction signals having respectively predetermined frequencies;
subtraction means for subtracting the correction signal from the signal in order to generate a corrected signal having a reduced crest factor,
wherein the respectively predetermined frequencies are selected such that the correction signal, which has a period length that is shorter than a length of the signal, becomes periodic,
wherein the means for generating the correction signal determine a period of the correction signal and determine the correction signal as a periodic continuation of the one period,
wherein the signal is a digital signal comprising a predetermined number N of sampled values,
wherein at least one auxiliary signal comprising M sampled values is determined, M corresponding to the period length,
wherein the one period of the correction signal is determined such that, on subtraction of the one period of the correctional from the at least one auxiliary signal, a peak value of the at least one auxiliary signal is reduced,
wherein the at least one auxiliary signal comprises a first auxiliary signal $$x\max(k) = \max\{x(k + jM)\}; j = 0 \ldots \left(\frac{N}{M} - 1\right); k = 1 \ldots M$$

and a second auxiliary signal $$x\min(k) = \min\{x(k + jM)\}; j = 0 \ldots \left(\frac{N}{M} - 1\right); k = 1 \ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, {x(k+j–M)} representing the set of all of the sampled values x (k+jM) for all of the values j of the signal
wherein a period of a standardized correction signal is determined by combining the partial correction signals with the respectively predetermined frequencies, and wherein the following steps are carried out for determining the period of the correction signal:
(i) setting the period of the correction signal to 0,
(ii) determining a position imax of a largest, in terms of amount, sampled value of the first auxiliary signal and the second auxiliary signal in the first auxiliary signal or in the second auxiliary signal,
(iii) cyclically displacing sampled values of the period of the standardized correction signal such that a maximum of the period of the standardized correction signal is located at the position imax, in order to obtain a cyclically displaced period, (iv) determining an amplitude as a function of the largest, in terms of absolute value, sampled value of the first auxiliary signal or the second auxiliary signal, (v) subtracting the cyclically displaced period multiplied by the amplitude from the at least one auxiliary signal in order to obtain a new at least one auxiliary signal for a following iteration, (vi) adding the cyclically displaced period multiplied by the amplitude to the period of the correction signal, (vii) increasing a counter by 1, and (viii) skipping to step (ii) for a following iteration if the counter is less than a predetermined value.

29. The device according to claim 28, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing, and wherein the period of the standardized correction signal is determined according to $$xn(k) = \frac{1}{Nk} \sum_{j=1}^{Nk} \cos\left(2\pi\mu(j) \cdot \frac{k}{N}\right)$$

Nk being a number of partial correction signals and $\mu(j)$ being the value $2^\lambda \cdot v$ for the respective partial correction signals.

30. The device according to claim 28, wherein the amplitude is calculated according to $$\Delta x = \frac{1}{2}(x\max(i\max) + x\min(i\max)).$$

31. The device according to claim 18, wherein the determination of the one period of the correction signal is carried out only if an absolute maximum value of the signal is greater than a predetermined limit value.

32. The device according to claim 18, wherein the signal is a signal to be issued to a filter, in that the signal is filtered using a model of the filter in order to generate a filtered signal, wherein the method according to claim 1 is carried out using the filtered signal as a signal in order to obtain an additional correction signal for the filtered signal, and in that the correction signal) for the signal is determined as a function of the additional correction signal and as a function of a transmission function of the model of the filter.

33. The device according to claim 32, wherein the model increases a sampling rate of the signal.

34. The device according to claim 18, wherein the signal is a signal generated using the discrete multitone modulation method.

35. The device according to claim 18, wherein the signal is a Very High Bit Rate Digital Subscriber Line (VDSL) signal.

36. The method according to claim 10, wherein the period length is equal to the length of the signal divided by an integer.

37. The method according to claim 10, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing.

38. The method according to claim 10, wherein the method is carried out only if an absolute maximum value of the signal is greater than a predetermined limit value.

39. The method according to claim 10, wherein the signal is a signal to be issued to a filter, wherein the signal is filtered using a model of the filter in order to generate a filtered signal, wherein the method according to claim 1 is carried out using the filtered signal as a signal in order to obtain an additional correction signal for the filtered signal, and in that the correction signal for the signal is determined as a function of the additional correction signal and as a function of a transmission function of the model of the filter.

40. The method according to claim 39, wherein the model increases a sampling rate of the signal.

41. The method according to claim 10, wherein the signal is a signal generated using the discrete multitone modulation method.

42. The method according to claim 10, wherein the signal is a VDSL signal.

43. The device according to claim 28, wherein the device is incorporated in a transmitter in order to reduce the crest factor of a signal to be transmitted by the transmitter.

44. The device according to claim 28, wherein the period length is equal to the length of the signal divided by an integer.

45. The device according to claim 28, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing.

46. The device according to claim 18, wherein the predetermined number of sampled values is $N=2^n$, n being a natural number, and wherein the respectively predetermined frequencies exhibit the form $2^\lambda \cdot v \cdot f_0$, $\lambda$ being a natural number smaller than n, v being a natural number and $f_0$ being a predetermined frequency spacing, wherein the at least one auxiliary signal comprises a first auxiliary signal $$x\max(k) = \max\{x(k+jM)\}; j = 0 \ldots \left(\frac{N}{M} - 1\right); k = 1 \ldots M$$

and a second auxiliary signal $$x\min(k) = \min\{x(k+jM)\}; j = 0 \ldots \left(\frac{N}{M} - 1\right); k = 1 \ldots M$$

xmax (k) being a $k^{th}$ sampled valued of the first auxiliary signal, xmin (k) being a $k^{th}$ sampled value of the second auxiliary signal and x (k) being a $k^{th}$ sampled value of the signal, $\{x(k+j-M)\}$ representing the set of all of the sampled values x (k+jM) for all of the values j of the signal, and wherein step (iii) comprises:

determining a position imax of a largest, in terms of absolute value, sampled value of the first auxiliary signal and the second auxiliary signal in the first auxiliary signal or second auxiliary signal, forming a first intermediate auxiliary signal xh1 (k) and a second intermediate auxiliary signal xh2 (k) according to $$xh1(k) = x\max(k)sgn\left[\cos\left(2\pi\mu\frac{k-i\max}{N}\right)\right]$$

$$k = 1 \ldots M,$$

$$xh2(k) = x\min(k)sgn\left[\cos\left(2\pi\mu\frac{k-i\max}{N}\right)\right]$$

wherein $\mu = 2^\lambda \cdot v$, determining a maximum value xhmax and a minimum value xhmin of the first intermediate auxiliary signal and the second intermediate auxiliary signal according to $$xh\max = \max\{xh1(k); xh2(k)\}$$

k=1 ... M $$xh\min = \min\{xh1(k); xh2(k)\}$$

{xh1(k); xh2 (k)} being a set of all of the sampled values of the first and the second intermediate auxiliary signal, determining a partial amplitude Δx1 according to $$\Delta x1 = \frac{1}{2}(xh\max + xh\min),$$

determining an amplitude Δx as a function of the partial amplitude Δx1, and determining the period of the intermediate partial correction signal according to $$\Delta xkp(k) = \Delta x \cdot \cos\left(2\pi\mu\frac{k-i\min}{N}\right); k = 1 \ldots M$$

Δxkp(k) being a sampled value of the period of the intermediate partial correction signal.

47. The device according to claim 28, wherein the predetermined number of sampled values is N=2$^n$, n being a natural number, and wherein the respectively predetermined frequencies exhibit the form $2^\lambda \cdot v \cdot f_0$, λ being a natural number smaller than n, v being a natural number and $f_0$ being a predetermined frequency spacing, wherein the at least one auxiliary signal comprises a first auxiliary signal $$x\max(k) = \max\{x(k+jM)\}; j = 0 \ldots \left(\frac{N}{M}-1\right); k = 1 \ldots M$$

and a second auxiliary signal $$x\min(k) = \min\{x(k+jM)\}; j = 0 \ldots \left(\frac{N}{M}-1\right); k = 1 \ldots M$$

xmax (k) being a k$^{th}$ sampled valued of the first auxiliary signal, xmin (k) being a k$^{th}$ sampled value of the second auxiliary signal and x (k) being a k$^{th}$ sampled value of the signal, {x(k+j·M)} representing the set of all of the sampled values x (k+jM) for all of the values j of the signal, and wherein step (iii) comprises:

determining a position imax of a largest, in terms of amount, sampled value of the first auxiliary signal and the second auxiliary signal in the first auxiliary signal or second auxiliary signal, forming a first intermediate auxiliary signal xh1 (k) and a second intermediate auxiliary signal xh2 (k) according to $$xh1(k) = x\max(k)sgn\left[\cos\left(2\pi\mu\frac{k-i\max}{N}\right)\right]$$

$$k = 1 \ldots M,$$

$$xh2(k) = x\min(k)sgn\left[\cos\left(2\pi\mu\frac{k-i\max}{N}\right)\right]$$

wherein $\mu = 2^\lambda \cdot v$, determining a maximum value xhmax and a minimum value xhmin of the first intermediate auxiliary signal and the second intermediate auxiliary signal according to $$xh\max = \max\{xh1(k); xh2(k)\}$$

k=1 ... M, $$xh\min = \min\{xh1(k); xh2(k)\},$$

{xh1(k); xh2(k)} being a set of all of the sampled values of the first and the second intermediate auxiliary signal, determining a partial amplitude Δx1 according to $$\Delta x1 = \frac{1}{2}(xh\max + xh\min),$$

determining an amplitude Δx as a function of the partial correction amplitude Δx1, and determining the period of the intermediate partial correction signal according to $$\Delta xkp(k) = \Delta x \cdot \cos\left(2\pi\mu\frac{k-i\min}{N}\right); k = 1 \ldots M$$

Δxkp(k) being a sampled value of the period of the intermediate partial correction signal.

48. The device according to claim 46, wherein the amplitude Δx is determined by multiplying the partial amplitude Δx1 by a weighting factor.

49. The device according to claim 46, wherein a further partial amplitude Δx2 is determined according to $$\Delta x2 = \frac{1}{2}(\max\{x\max(k)\} + \min\{x\min(k)\})$$

and the amplitude Δx is determined according to $$\Delta x = \Delta x1 \cdot g1 + \Delta x2 \cdot g2$$

g1 and g2 being weighting factors.

50. The device according to claim 47, wherein the amplitude Δx is determined by multiplying the partial amplitude Δx1 by a weighting factor.

51. The according to claim 47, wherein a further partial amplitude Δx2 is determined according to $$\Delta x2 = \frac{1}{2}(\max\{x\max(k)\} + \min\{x\min(k)\})$$

and the amplitude Δx is determined according to $$\Delta x = \Delta x1 \cdot g1 + \Delta x2 \cdot g2$$

g1 and g2 being weighting factors.

52. The device according to claim 28, wherein the determining of the one period of the correction signal is carried out only if an absolute maximum value of the signal is greater than a predetermined limit value.

53. The device according to claim 28, wherein the signal is a signal to be issued to a filter, in that the signal is filtered using a model of the filter in order to generate a filtered signal, wherein the method according to claim 1 is carried out using the filtered signal as a signal in order to obtain an additional correction signal for the filtered signal, and in that the correction signal) for the signal is determined as a function of the additional correction signal and as a function of a transmission function of the model of the filter.

54. The device according to claim 28, wherein the model increases a sampling rate of the signal.

55. The device according to claim 28, wherein the signal is a signal generated using the discrete multitone modulation method.

56. The device according to claim 28, wherein the signal is a Very High Bit Rate Digital Subscriber Line (VDSL) signal.

* * * * *